United States Patent
Kawakami et al.

(10) Patent No.: US 11,593,739 B2
(45) Date of Patent: Feb. 28, 2023

(54) SYSTEM AND METHOD FOR SUPPORTING PRODUCTION MANAGEMENT

(71) Applicant: HITACHI, LTD., Tokyo (JP)

(72) Inventors: Kenichirou Kawakami, Tokyo (JP); Shigeyasu Kubo, Tokyo (JP); Kazuhiro Matsuya, Tokyo (JP); Yusuke Yajima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 16/643,918

(22) PCT Filed: Jul. 9, 2019

(86) PCT No.: PCT/JP2019/027174
§ 371 (c)(1),
(2) Date: Jun. 18, 2020

(87) PCT Pub. No.: WO2021/005717
PCT Pub. Date: Jan. 14, 2021

(65) Prior Publication Data
US 2021/0081870 A1    Mar. 18, 2021

(51) Int. Cl.
*G06Q 10/06* (2012.01)
*G06Q 10/0631* (2023.01)

(52) U.S. Cl.
CPC ............ *G06Q 10/06316* (2013.01); *G06Q 10/06313* (2013.01); *G06Q 10/063114* (2013.01)

(58) Field of Classification Search
None
See application file for complete search history.

(56) References Cited

U.S. PATENT DOCUMENTS

| | | | |
|---|---|---|---|
| 2006/0053043 A1* | 3/2006 | Clarke | G06Q 10/10 705/7.17 |
| 2007/0150327 A1* | 6/2007 | Dromgold | G06F 16/2477 705/7.17 |

(Continued)

FOREIGN PATENT DOCUMENTS

| | | |
|---|---|---|
| JP | 6287018 B2 | 3/2018 |
| WO | 2019/064892 A1 | 4/2019 |

OTHER PUBLICATIONS

International Search Report of PCT/JP2019/027174 dated Oct. 1, 2019.

*Primary Examiner* — Eric W Stamber
*Assistant Examiner* — Ashley Y Young
(74) *Attorney, Agent, or Firm* — Mattingly & Malur, PC

(57) ABSTRACT

Regardless of the production method applied, it is possible for a user to estimate a factor that causes trouble in one of the resources belonging to a resource type. A supporting system refers to management information indicating a production past record of the production system, and displays an overlay chart in which a diagram chart is relatively superimposed on a Gantt chart. The Gantt chart is a chart for a first resource type and has a resource axis and a time axis. The diagram chart is for a second resource type. In the overlay chart, a polygonal line connecting a plurality of points corresponding to a second resource, belonging to the second resource type, is on the Gantt chart, and each point is plotted at a position corresponding to an execution time of a step and a first resource, belonging to the first resource type, related to the step.

8 Claims, 17 Drawing Sheets

(56) References Cited

U.S. PATENT DOCUMENTS

| | | |
|---|---|---|
| 2015/0097840 A1 | 4/2015 | Nishimura et al. |
| 2017/0249574 A1* | 8/2017 | Knijnik ............ G06Q 10/06313 |
| 2020/0184692 A1* | 6/2020 | Yang ...................... G06Q 50/04 |

* cited by examiner

FIG. 4

EXECUTION PAST RECORD TABLE GROUP 351

_401_

| PRODUCT ID | TIME | STEP ID | Status |
|---|---|---|---|
| id0001 | 2019-04-12 11:29:00 | 1 | START |
| id0001 | 2019-04-12 12:43:00 | 1 | END |
| id0002 | 2019-04-12 11:47:00 | 3 | START |
| ... | | | |

411 / 412 / 413 / 414

_402_

| WORKER ID | TIME | TARGET PRODUCT | STEP ID | Status |
|---|---|---|---|---|
| wk01 | 2019-04-12 11:29:00 | id0001 | 1 | START |
| wk01 | 2019-04-12 12:43:00 | id0001 | 1 | END |
| wk02 | 2019-04-12 11:47:00 | id0002 | 3 | START |
| ... | | | | |

421 / 422 / 423 / 424 / 425

_403_

| FACILITY ID | TIME | TARGET PRODUCT | STEP ID | Status |
|---|---|---|---|---|
| eq001 | 2019-04-12 11:29:00 | id0001 | 1 | START |
| eq001 | 2019-04-12 12:43:00 | id0001 | 1 | END |
| eq002 | 2019-04-12 11:4:00 | id0002 | 3 | START |
| ... | | | | |

EXECUTION PLAN TABLE GROUP 352

501

| PRODUCT ID 511 | TIME 512 | STEP ID 513 | Status 514 |
|---|---|---|---|
| id0001 | 2019-04-12 11:00:00 | 1 | START |
| id0001 | 2019-04-12 12:00:00 | 1 | END |
| ... | ... | ... | ... |

502

| WORKER ID 521 | TIME 522 | TARGET PRODUCT 523 | STEP ID 524 | Status 525 |
|---|---|---|---|---|
| wk01 | 2019-04-12 11:00:00 | id0001 | 1 | START |
| wk01 | 2019-04-12 12:00:00 | id0001 | 1 | END |
| ... | ... | ... | ... | ... |

503

| FACILITY ID 531 | TIME 532 | TARGET PRODUCT 533 | STEP ID 534 | Status 535 |
|---|---|---|---|---|
| eq001 | 2019-04-12 11:00:00 | id0001 | 1 | START |
| eq001 | 2019-04-12 12:00:00 | id0001 | 1 | END |
| ... | ... | ... | ... | ... |

FIG. 6

PARTS RELATED TABLE GROUP
353

601

| PRODUCT ID | EXPECTED ORDER DATE | EXPECTED DELIVERY DATE | EXPECTED SERVICE DATE | ORDER DATE | DELIVERY DATE | SERVICE DATE | Status |
|---|---|---|---|---|---|---|---|
| pt0001 | 2019-04-07 | 2019-04-11 | 2019-04-12 | 2019-04-08 | | | ORDERED AND UNDELIVERED |
| pt0002 | 2019-04-08 | 2019-04-12 | 2019-04-13 | 2019-04-08 | 2019-04-013 | 2019-04-14 | SERVICE COMPLETED |
| ... | | | | | | | ... |

611  612  613  614  615  616  617  618

602

| PRODUCT ID | USE STEP | MODEL | CORRESPONDING PRODUCT |
|---|---|---|---|
| pt0001 | 1 | XX01 | id0001 |
| pt0002 | 1 | XX02 | id0001 |
| ... | | ... | ... |

RECOMMENDATION DETERMINATION TABLE 354

| | RECOMMENDATION CONDITION | | | | | | ESTIMATED FACTOR 702 |
|---|---|---|---|---|---|---|---|
| | FIRST PAST RECORD STATE 711 | | | SECOND PAST RECORD STATE 712 | | | |
| RESOURCE TYPE 761 | CORRESPONDING STATE 762 | THRESHOLD 763 | RESOURCE TYPE 761 | CORRESPONDING STATE 762 | THRESHOLD 763 | | |
| Material | DIFFERENCE BETWEEN END TIME OF PREVIOUS STEP AND START TIME OF NEXT STEP IS EQUAL TO OR LARGER THAN THRESHOLD | 6 | Man | DIFFERENCE BETWEEN END TIME OF PREVIOUS STEP AND START TIME OF NEXT STEP IS SMALLER THAN THRESHOLD | 1 | | WORKER'S WORK IS NOT COMPLETED IN TIME |
| Material | DIFFERENCE BETWEEN END TIME OF PREVIOUS STEP AND START TIME OF NEXT STEP IS EQUAL TO OR LARGER THAN THRESHOLD | 6 | Machine | DIFFERENCE BETWEEN END TIME OF PREVIOUS STEP AND START TIME OF NEXT STEP IS SMALLER THAN THRESHOLD | 1 | | EXECUTION IN FACILITY IS NOT COMPLETED IN TIME |
| ... | ... | ... | ... | ... | ... | | ... |

EVENT PAST RECORD TABLE GROUP 355

801

| PRODUCT ID | TIME | STEP ID | EVENT |
|---|---|---|---|
| id0025 | 2019-04-12 15:29:00 | 1 | OCCURRENCE OF DEFECTIVE PRODUCT |
| id0031 | 2019-04-13 16:43:00 | 3 | OCCURRENCE OF REWORK |
| ... | ... | ... | ... |

802

| WORKER ID | TIME | TARGET PRODUCT | STEP ID | EVENT |
|---|---|---|---|---|
| wk01 | 2019-04-12 11:29:00 | None | None | BREAK TIME |
| wk03 | 2019-04-12 12:43:00 | id0041 | 1 | TROUBLE SHOOTING |
| ... | ... | ... | ... | ... |

803

| FACILITY ID | TIME | TARGET PRODUCT | STEP ID | EVENT |
|---|---|---|---|---|
| eq004 | 2019-04-12 09:29:00 | id0054 | 1 | ABNORMAL STOP |
| eq004 | 2019-04-12 10:43:00 | id0054 | 1 | ABNORMAL STOP RECOVERY |
| ... | ... | ... | ... | ... |

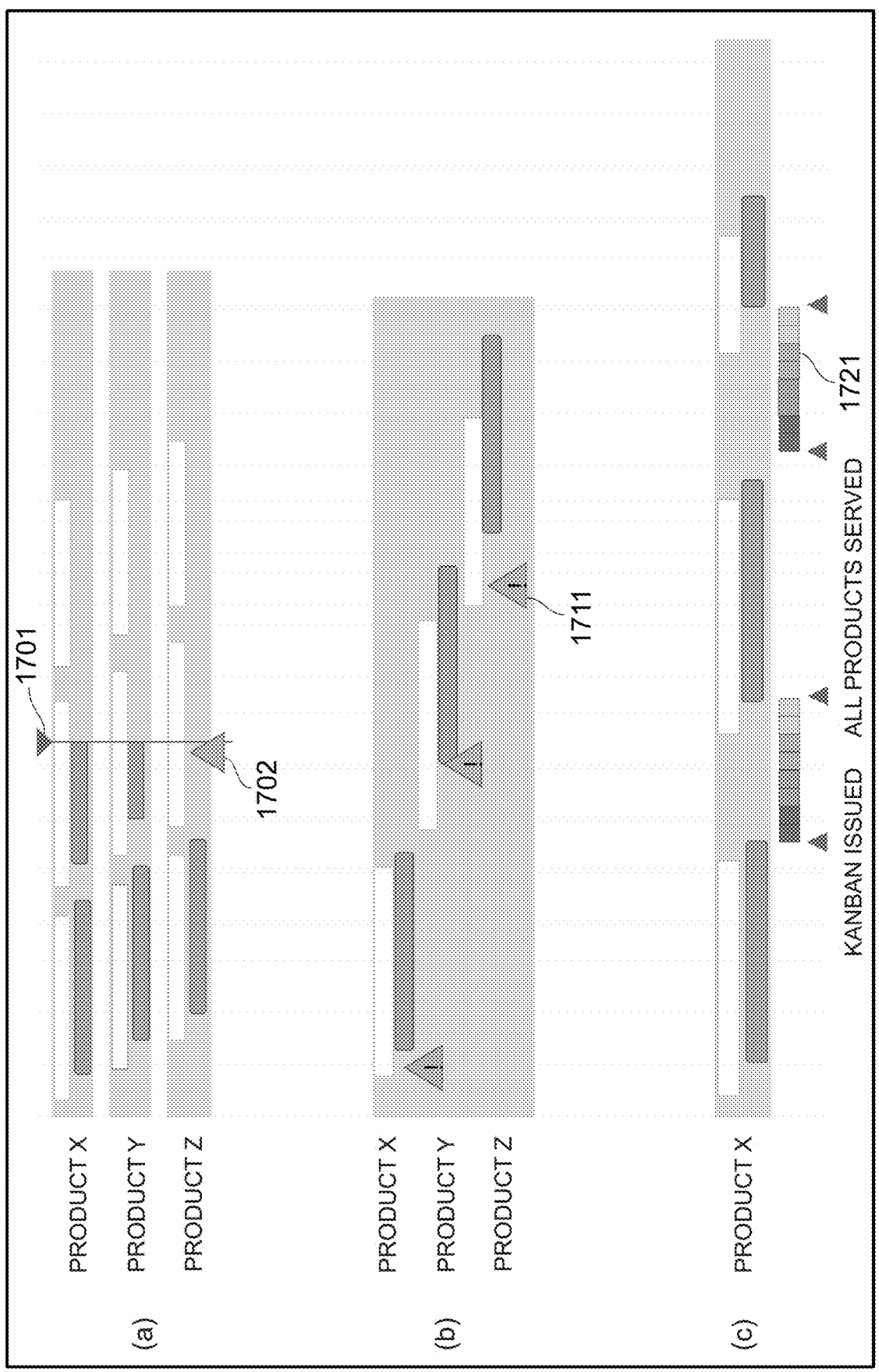

SYSTEM AND METHOD FOR SUPPORTING PRODUCTION MANAGEMENT

TECHNICAL FIELD

The present invention generally relates to a computer technique for supporting production management.

BACKGROUND ART

As a technique for supporting production management, the technique disclosed in PTL 1 is known.

CITATION LIST

Patent Literature

[PTL 1] Japanese Patent No. 6287018

SUMMARY OF INVENTION

Technical Problem

According to the visualization technique disclosed in PTL 1, it is possible to find a product in which a trouble such as a long production time or a long waiting time has occurred for each product. However, the visualization technique disclosed in PTL 1 makes it impossible to estimate a factor that causes such a trouble.

In addition, it is considered that the problem that the factor of a trouble cannot be estimated is more likely to occur in production management in, rather than a line production method, a production method in which a plurality of different types of products (parts or materials serving as a base of a finished product) share some steps (e.g., a job shop production method or a cell production method). The visualization technique disclosed in PTL 1 is effective for a line production method, but is difficult to apply to any production method other than the line production method.

Solution to Problem

A supporting system refers to management information including information that indicates a production past record of a production system having a plurality of steps, and displays an overlay chart that is a chart in which a diagram chart is relatively superimposed on a Gantt chart. As a plurality of resource types related to production, there are two or more of resource types out of so-called 3M in production management, i.e., Man (persons involved in production), Machine (facility related to production (e.g., apparatus)), and Material (product related to production (or parts thereof)). The management information indicates, for each of the plurality of resource types, for each resource belonging to the resource type, a step performed on the resource, an execution time of the step, and one or more resources belonging to, respectively, one or more resource types different from the resource type to which the resource belongs and related to the resource. The Gantt chart is a chart generated on the basis of the management information referred to for a first resource type of the plurality of resource types and has a resource axis that is an axis corresponding to resources, and a time axis that is an axis orthogonal to the resource axis and corresponding to time. The diagram chart is a chart generated on the basis of the management information referred to for a second resource type of the plurality of resource types. In the overlay chart, for each of a plurality of first resources (a plurality of resources belonging to the first resource type), when at least a part of an execution time zone of the first resource is included in a display target period (a period covered by the time axis), the Gantt chart includes an execution zone that is a zone representing the at least a part of the time zone. In the overlay chart, for each of a plurality of second resources (a plurality of resources belonging to the second resource type), there is a polygonal line connecting a plurality of points corresponding to the second resource on the Gantt chart, and each of the plurality of points is plotted at a position that corresponds to an execution time of a step performed on the second resource and the first resource related to the second resource and the step.

Advantageous Effects of Invention

The overlay chart described above makes it easy to understand a relationship between a past record of a resource belonging to one of the first resource type and the second resource type and a past record of a resource belonging to the other of the resource types. Therefore, regardless of the production method applied to the production system, it is possible for a user to estimate a factor that causes a trouble in any of the resources belonging to one of the resource types.

BRIEF DESCRIPTION OF DRAWINGS

FIG. 4 shows an example of an execution past record table group.
FIG. 5 shows an example of an execution plan table group.
FIG. 6 shows an example of a parts related table group.
FIG. 7 shows an example of a recommendation determination table.
FIG. 8 shows an example of an event past record table group.
FIG. 17 shows an example of a display of information on parts.

DESCRIPTION OF EMBODIMENTS

Figure 1:
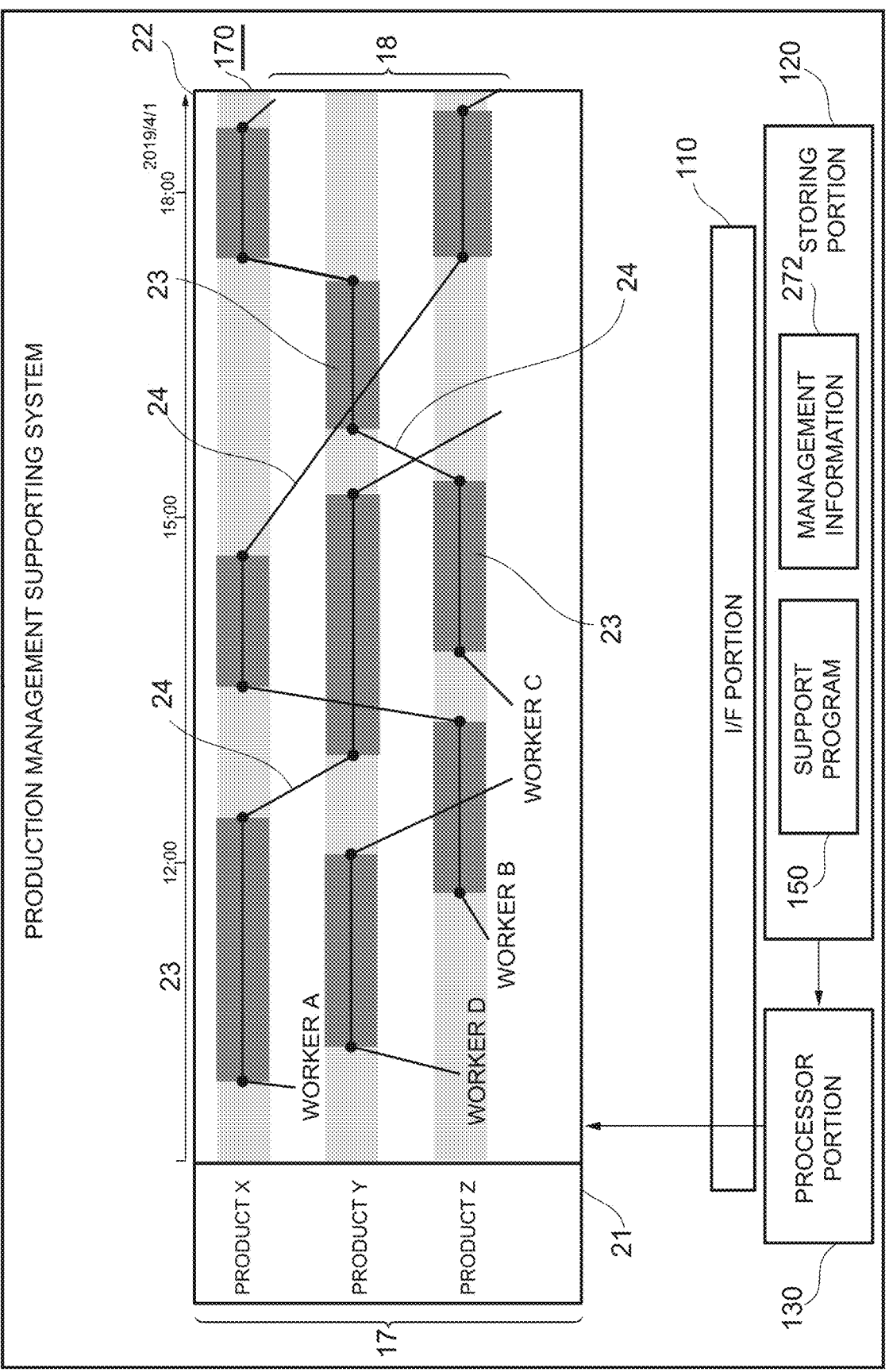
FIG. 1 shows the outline of an embodiment.

In the following description, an "interface portion" includes one or more interfaces. The one or more interfaces may include at least one of a user interface portion and a communication interface portion. The user interface portion may include at least one I/O device among one or more I/O devices (e.g., input devices (e.g., a keyboard and a pointing device) and an output device (e.g., a display device)) and a display computer or may include an interface device for the at least one I/O device. The communication interface portion may include one or more communication interface devices. The one or more communication interface devices may be one or more communication interface devices of the same type (i.e., one or more network interface cards (NICs)) or two or more communication interface devices of different types (e.g., a NIC and a host bus adapter (HBA)).

In the following description, a "storing portion" includes one or more memories. At least one of the memories associated with the storing portion may appropriately be a volatile memory. The storing portion is used mainly during a process performed by the processor portion. The storing portion may also include, in addition to the memories, one or more nonvolatile storing devices (e.g., hard disk drives (HDDs) or solid state drives (SSDs)).

In the following description, the "processor portion" includes one or more processors. At least one of the processors is typically a microprocessor such as a central processing unit (CPU), but the processors may also include a processor of another type such as graphics processing unit (GPU). Each of the one or more processors may be a single-core processor or a multi-core processor. The processors may also include a hardware circuit which performs a part or the whole of a process.

In the following description, a process may be described using a "program" as a subject. Since a program performs a determined process by being executed by the processor portion, while appropriately using the storing portion (e.g., memory), the interface portion (e.g., communication port), and/or the like, the subject of the processor may also be the processor. The process described using the program as the subject may also be a process performed by the processor portion or an apparatus having the processor portion. The processor portion may also include a hardware circuit (e.g., field-programmable gate array (FPGA) or an application specific integrated circuit (ASIC)) which performs apart or the whole of the process. The program may also be installed from a program source to an apparatus such as a computer. The program source may be, e.g., a program distribution server or a recording medium (e.g., non-transitory recording medium) which is readable by the computer. In the following description, two or more programs may be implemented as one program or one program may be implemented as two or more programs.

In the following description, information may be described using such an expression as "a xxx table", but the information may be expressed using any data structure. Specifically, to show that the information does not depend on any data structure, "a xxx table" can be referred to also as "xxx information". Also, in the following description, a configuration of each table is exemplary. One table may be divided into two or more tables or all or any of two or more tables may be one table.

In the following description, a "production management supporting system" may be configured to include one or more computers. Specifically, when, e.g., a computer has a display device and displays information on the display device thereof, the computer may appropriately be the production management supporting system. Alternatively, when, e.g., a first computer (e.g., management server) transmits information to be displayed to a remote second computer (display computer (e.g., management client)) and the display computer displays the information (when the first computer displays the information on the second computer), at least the first computer of the first and second computers may appropriately be the production management supporting system. The production management supporting system may also have an interface portion, a storing portion, and a processor portion coupled to the interface portion and the storing portion. The "display of information to be displayed" by the computer in the production management supporting system may be the display of information to be displayed on the display device of the computer or may also be the transmission of the information to be displayed from the computer to the display computer (in the latter case, the display computer displays the information to be displayed). The function of at least one of the management server in the production management supporting system and the production management supporting system may also be implemented by a virtual computer (e.g., virtual machine (VM)) implemented by at least one physical computer (e.g., a physical calculation resource on a cloud basis). At least a portion of the production management supporting system may be software-defined.

A "product" generally means a produced item, i.e., a finished product. However, in the following description, the "product" means each of the items loaded in a production system. Accordingly, in the following description, the "product" may be any of an item before loaded into the production system, an item currently in the production system (i.e., "semi-finished product"), and a finished product in a shippable state through all the corresponding steps in the production system.

Also, in the following description, the intra-step range of a step x (x is a natural number) may be referred to as an "intra-step range x", while an inter-step range between the step x and a step y may be referred to as an "inter-step range x-y". Also, in the following description, the intra-facility range of a facility x (x is a natural number) may be referred to as an "intra-facility range x", while an inter-facility range between the facility x and a facility y may be referred to as an "inter-facility range x-y".

FIG. 1 shows the outline of the embodiment. Note that, in the following description, a facility belonging to a step is adopted as a step element by way of example, but the step element may be a step element other than the facility, for example, a worker, instead of or in addition to the facility. Also, in the following description, "UI", which stands for User Interface, typically refers to a GUI (Graphical User Interface).

A production management supporting system 100 has an I/F (interface) portion 110, a storing portion 120, and a processor portion 130 coupled to the I/F portion 110 and the storing portion 120. The storing portion 120 stores management information 272 and a support program 150.

The management information 272 includes information indicating a production past record of a production system having a plurality of steps. Specifically, as a plurality of resource types related to production for example, in the present embodiment, there are so-called 3M, specifically three resource types: Man, Machine, and Material. The management information 272 indicates, for each of the plurality of resource types, for each resource belonging to the resource type, a step performed on the resource, an execution time of the step, and one or more resources belonging to, respectively, one or more resource types different from the resource type to which the resource belongs and related to the resource. The execution time of the step may be one or more times selected between the start time of the step and the end time thereof in accordance with a predetermined rule. In the present embodiment, both of the start time and the end time are adopted.

The support program 150 performs visualization of a production situation as one of supports for production management. Specifically, the support program 150 generates an overlay chart 170 in which a diagram chart 18 for the second resource type is relatively superimposed on a Gantt chart 17 for the first resource type on the basis of a result of analyzing the management information 272 by being executed by the processor portion 130 and displays the overlay chart 170. The overlay chart 170 may be generated step by step in response to a selection operation. For example, first, the Gantt chart 17 is generated, and thereafter, the diagram chart 18 may be superimposed on the Gantt chart 17 (for example, a diagram (a polygonal line 24 for each worker in the example of FIG. 1) may be drawn on the Gantt chart 17 on the coordinate system of the Gantt chart 17). The "selection operation" is a user operation for selecting any one or more targets and may be, for example, a range selection using a mouse or an operation of a GUI object on a UI (e.g., press a button, select one from a pull-down menu).

The Gantt chart 17 is a chart generated on the basis of the management information 272 for Material (an example of the first resource type). The Gantt chart 17 has a resource axis 21 that is an axis corresponding to resources (here, products), and a time axis 22 that is an axis orthogonal to the resource axis 21 and corresponding to time. The diagram chart 18 is a chart generated on the basis of the management information 272 for Man (an example of the second resource type). In the overlay chart 170, for each of a plurality of products X to Z (an example of a plurality of first resources), when at least a part of an execution time zone of the product is included in a display target period (a period covered by the time axis), the Gantt chart 17 includes an execution zone 23 that is a zone representing the at least a part of the time zone. In the overlay chart 170, for each of a plurality of workers A to C (an example of a plurality of second resources), there is a polygonal line 24 connecting a plurality of points corresponding to the worker on the Gantt chart 17, and each of the plurality of points is plotted at a position that corresponds to an execution time of a step performed on the worker and the product related to the worker and the step.

The overlay chart 170 shows a relationship between the past records of a resource belonging to one resource type of Material and Man and the past records of a resource belonging to the other resource type of Material and Man (e.g., a relationship among a product, a worker, and an execution time of a step). Therefore, regardless of the production method applied to the production system, it is possible for a user (e.g., an administrator of the production system) to estimate a reason why a trouble has occurred in any of the resources belonging to one resource type of Material and Man.

The following will describe the present embodiment in detail.

Figure 2:
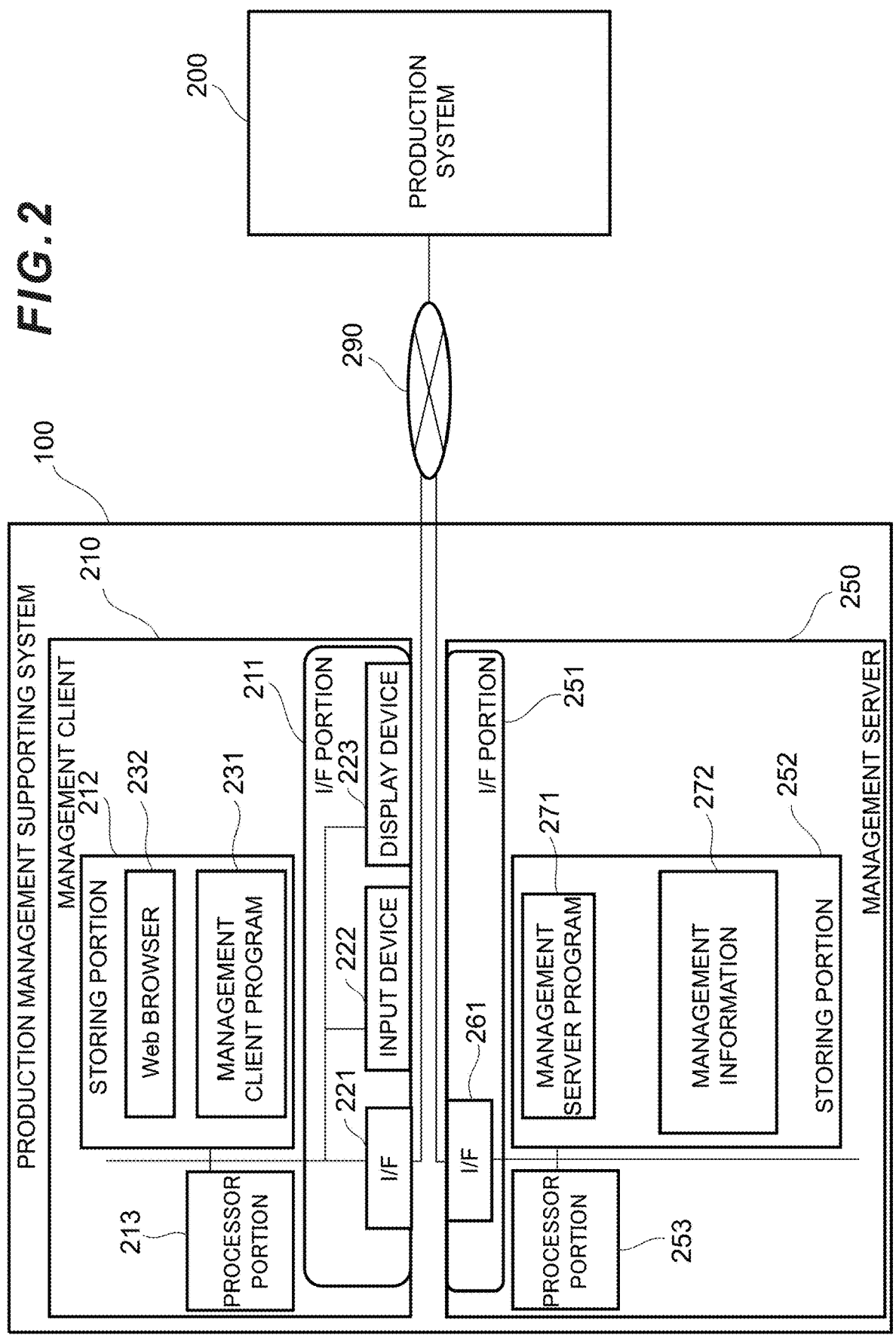
FIG. 2 shows a configuration of a production management supporting system according to the embodiment.

FIG. 2 shows a configuration of the production management supporting system 100.

The production management supporting system 100 includes a management server 250 and one or more management clients 210 coupled to the management server 250. To the management server 250, each of the management clients 210 and a production system 200 is coupled via a communication network (e.g., a local area network (LAN), a wide area network (WAN), or the Internet) 290.

The production system 200 is a production system (e.g., a factory) in which a plurality of different models of products are loaded and the sequential order of two or more of a plurality of steps is different depending on the model, and is, for example, a job shop production system or a cell production system. The production system 200 includes a plurality of facilities (apparatuses) for a plurality of steps, a plurality of sensors which regularly perform measurement for a plurality of measurement items with regard to the plurality of steps, and a server which stores a plurality of measurement values regularly obtained using the plurality of sensors and transmits the plurality of measurement values to the management server 250. From the production system 200, information (raw data such as, e.g., production dynamic state data, facility data, and quality measurement data) is regularly or irregularly transmitted to the management server 250 and stored in the management server 250. For example, the information includes, for each product, a product ID, and the start time and the end time of each step. Note that the production system. 200 may be a production system other than the production systems described above (e.g., a job shop production system or a cell production system), for example, a line production system.

The management client 210 has an I/F portion 211, a storing portion 212, and a processor portion 213 coupled to the I/F portion 211 and the storing portion 212.

The I/F portion 211 includes an I/F (communication interface device coupled to the communication network 290) 221, an input device (e.g., pointing device or keyboard) 222, and a display device (device having a physical screen which displays information) 223. A touch screen integrally including the input device 222 and the display device 223 may also be adopted.

The storing portion 212 stores a computer program executed by the processor portion 213 and information used by the processor portion 213. Specifically, for example, the storing portion 212 stores a management client program 231 and a Web browser 232. The management client program 231 communicates with the management server 250 and displays the UI described above via the Web browser 232.

The management server 250 has an I/F portion 251, a storing portion 252, and a processor portion 253 coupled to the I/F portion 251 and the storing portion 252.

The I/F portion 251 includes an I/F (communication interface device coupled to the communication network 290) 261.

The storing portion 252 stores a computer program executed by the processor portion 253 and information used by the processor portion 253. Specifically, for example, the storing portion 252 stores a management server program 271 and management information 272. The management server program 271 communicates with the management client program 231. The management information 272 may include information related to a past record such as the start time and the end time of each of the steps for each product loaded in the production system 200. The management information 272 may include the raw data mentioned above. Also, the management information 272 may include, for example, information generated on the basis of a result of analyzing information related to a past record, and various thresholds.

Through a cooperative process performed by the management server program 271, the management client program 231, and the Web browser 232, the display of the UI is implemented.

The relationships between the components shown in FIG. 2 and the components shown in FIG. 1 are, e.g., as follows. Specifically, of the I/F portions 211 and 251, at least the I/F portion 251 corresponds to the I/F portion 110. Of the storing portions 212 and 252, at least the storing portion 252 corresponds to the storing portion 120. Of the processor portions 213 and 253, at least the processor portion 253 corresponds to the processor portion 130. Of the management server program 271, the management client program 231, and the Web browser 232, at least the management server program 271 corresponds to the support program 150.

Figure 3:
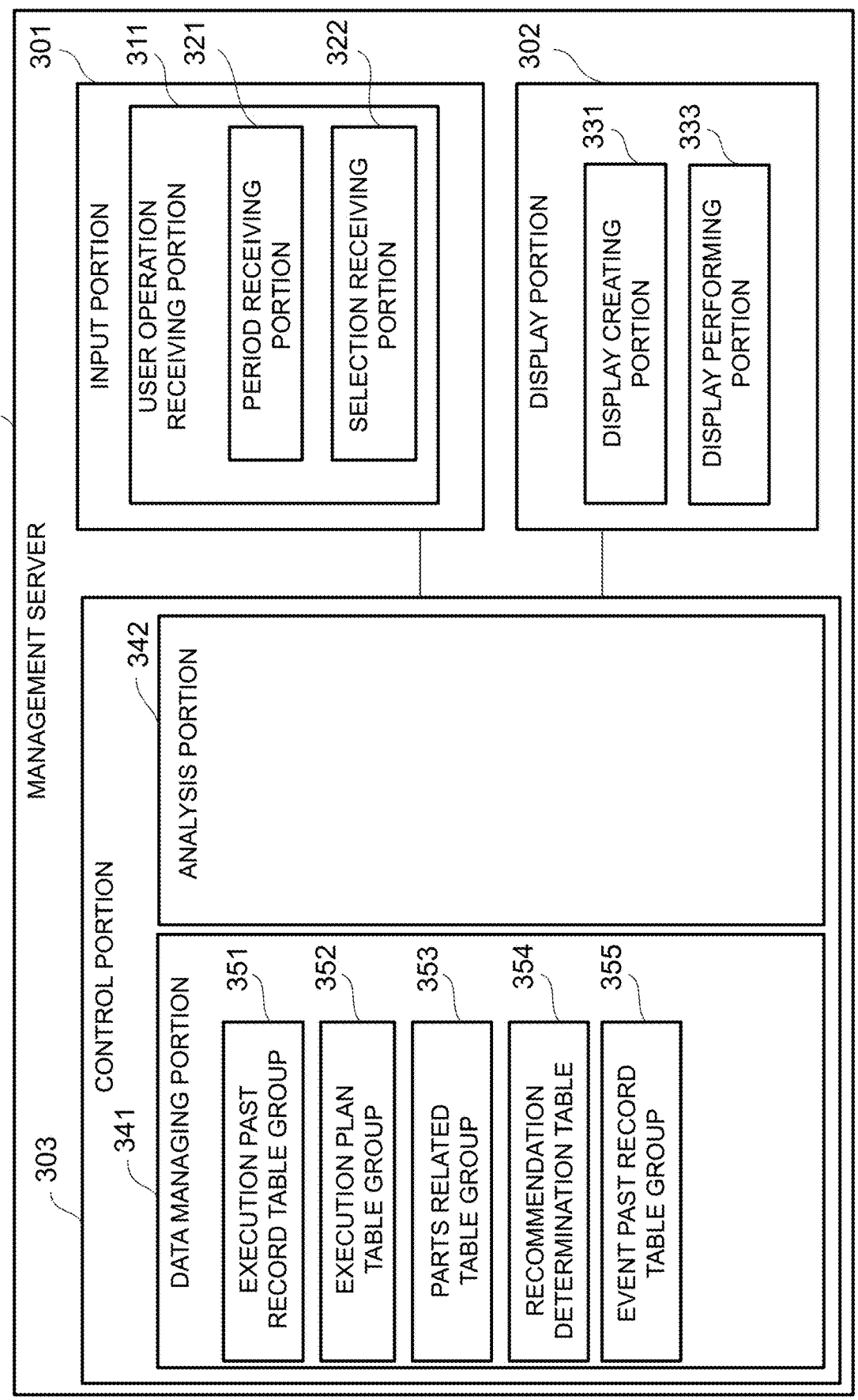
FIG. 3 shows an example of functions implemented in a management server.

FIG. 3 shows an example of the functions implemented in the management server 250.

The management server program 271 is executed by the processor portion 253 to allow the illustrated functions, i.e., an input portion 301, a display portion 302, and a control portion 303 to be implemented. In other words, the management server program 271 has the input portion 301, the display portion 302, and the control portion 303.

The input portion 301 is the function for receiving information. The input portion 301 includes a user operation receiving portion 311. The user operation receiving portion 311 is a function for receiving a user operation (operation performed on the screen by the user using the input device). The user operation receiving portion 311 includes a period receiving portion 321 and a selection receiving portion 322. The period receiving portion 321 is a function for receiving a specification of the display target period. The selection receiving portion 322 is a function for receiving the selection operation described above.

The display portion 302 is a function for displaying information. The display portion 302 includes a display generating portion 331 and a display performing portion 333. The display generating portion 331 is a function for generating the display of a UI (e.g., drawing it on a memory portion). The display performing portion 333 is a function for performing the display of the generated UI.

The control portion 303 is a function for control. The control portion 303 includes a data managing portion 341 and an analysis portion 342.

The data management portion 341 manages information included in the management information 272, for example, an execution past record table group 351, an execution plan table group 352, a parts related table group 353, a recommendation determination table 354, and an event past record table group 355. For example, the data management portion 341 acquires a past record data of a product, a worker, and a facility and updates at least a part of the management information 272 (e.g., the execution past record table group 351 and the event past record table group 355) on the basis of the past record data. Note that the "past record data" is data showing the past record of production and including, e.g., a product ID (e.g., product number), a step ID (e.g., step number), a time (e.g., the collection time of the data or the starting time and the ending time of the step), and a status (showing that, e.g., a process is currently performed in the step or the step was ended). For example, the data managing portion 341 regularly or irregularly collects the past record data from the production system 200 and updates at least a portion of the management information 272.

The analysis portion 345 is a function for analyzing the management information 272.

The following will describe an example of a table included in the management information 272. Note that, as described above, the production system 200 is a production system in which the sequential order of two or more of a plurality of steps is different depending on the model, and therefore, the management information 272 may include, for each model, information indicating the product ID of a product belonging to the model and the sequential order of the steps for the model, but not illustrated.

FIG. 4 shows an example of the execution past record table group 351.

The execution past record table group 351 includes a plurality of execution past record tables corresponding respectively to a plurality of resource types. In the present embodiment, the execution past record table group 351 includes a Material past record table (an execution past record table for Material) 401, a Man past record table (an execution past record table for Man) 402, and a Machine past record table (an execution past record table for Machine) 403.

The Material past record table 401 has records for individual products on a one-to-one basis. Each record stores information such as a product ID 411, a time 412, a step ID 413, and a status 414. One product is taken as an example (which is a "product of interest" in the description of FIG. 4). The product ID 411 indicates the ID of the product of interest. The time 412 indicates the execution time (start time or end time of execution) of a step for the product of interest. Also, the unit of time is represented in a year/month/day/hour/minute/second unit, but the unit of a time may be rougher or finer than the unit used in the present embodiment or may also be represented in a different unit. The step ID 413 indicates the ID of a step performed on the product of interest. The status 414 indicates the status of the step performed on the product of interest (e.g., "start" of the step or "end" of the step).

The Man record table 402 has records for individual workers on a one-to-one basis. Each record stores information such as a worker ID 421, a time 422, a target product 423, a step ID 424, and a status 425. One worker is taken as an example (which is a "worker of interest" in the description of FIG. 4). The worker ID 421 indicates the ID of the worker of interest. The time 422 indicates the execution time of a step performed by the worker of interest on the product. The target product 423 indicates the ID of a product on which the step is performed by the worker of interest. The step ID 424 indicates the ID of the step performed by the worker of interest. The status 425 indicates the status of the step performed on the product of interest (e.g., "start" of the step or "end" of the step).

The Machine past record table 403 has records for individual facilities on a one-to-one basis. Each record stores information such as a facility ID 431, a time 432, a target product 433, a step ID 434, and a status 435. One facility is taken as an example (which is a "facility of interest" in the description of FIG. 4). The facility ID 431 indicates the ID of the facility of interest. The time 432 indicates the execution time of a step performed by the facility of interest on the product. The target product 433 indicates the ID of a product on which the step is performed by the facility of interest. The step ID 434 indicates the ID of the step performed by the facility of interest. The status 425 indicates the status of the step performed on the product of interest (e.g., "start" of the step or "end" of the step).

FIG. 5 shows an example of the execution plan table group 352.

The execution plan table group 352 includes a plurality of execution plan tables corresponding respectively to a plurality of resource types. In the present embodiment, the execution plan table group 352 includes a Material plan table (an execution plan table for Material) 501, a Man plan table (an execution plan table for Man) 502, and a Machine plan table (an execution plan table for Machine) 503. The configurations of the tables 501 to 503 are the same as those of the tables 401 to 403, respectively. Specifically, information 511 to 514 included in each record of the table 501 is the same as the information 411 to 414 except that it is for a plan instead of a past record. Information 521 to 525 included in each record of the table 502 is the same as the information 421 to 425 except that it is for a plan instead of a past record. Information 531 to 535 included in each record of the table 503 is the same as the information 431 to 435 except that it is for a plan instead of a past record.

FIG. 6 shows an example of the parts related table group 353.

The parts related table group 353 includes a parts plan past record table 601 and a parts table 602.

The parts plan past record table 601 indicates plans and past records about a plurality of states such as ordering, delivery, and serving of each part (a state in which the part arrives at the site of a step using the part). Specifically, the parts plan past record table 601 has, e.g., records for individual parts on a one-to-one basis. Each record stores information such as a part ID 611, an expected order date 612, an expected delivery date 613, an expected service date 614, an order date 615, a delivery date 616, a service date 617, and a status 618. One part is taken as an example (which is a "part of interest" in the description of FIG. 6). The part ID 611 indicates the ID of the part of interest. Information 612 to 614 is information related to a plan for the part of interest, and information 615 to 617 is information related to a past record of the part of interest. The expected order date 612 indicates the date on which the part of interest is expected to be ordered. The expected delivery date 613 indicates the date on which the part of interest is expected to be delivered. The expected service date 614 indicates the date on which the part of interest is expected to be served. The order date 615 indicates the date when the part of interest was ordered. The delivery date 616 indicates the date on which the part of interest was delivered. The service date 617 indicates the date on which the part of interest was served. The status 618 indicates a status of the part of interest.

The parts table 602 indicates a product and a step used for each part. Specifically, the parts table 602 has records for individual parts on a one-to-one basis. Each record stores information such as a part ID 621, a use step 622, a model 623, and a target product 624. One part is taken as an example (which is a "part of interest" in the description of FIG. 6). The part ID 621 indicates the ID of the part of interest. The use step 622 indicates the ID of a step at the serving destination of the part of interest. The model 623 indicates the ID of a model to which a product on which the part of interest is mounted belongs. The target product 624 indicates the ID of the product on which the part of interest is mounted.

FIG. 7 shows an example of the recommendation determination table 354.

The recommendation determination table 354 indicates one or more recommendation conditions related to a relationship between resource types, and a factor estimated, for each of the one or more recommendation conditions, to satisfy the recommendation condition. Specifically, for example, the recommendation determination table 354 has records for individual recommendation conditions on a one-to-one basis. Each record stores information such as a recommendation condition 701 and an estimated factor 702. One part is taken as an example (which is a "recommendation condition of interest" in the description of FIG. 7).

The recommendation condition 701 is information indicating a recommendation condition. The recommendation condition 701 includes information such as a first past record state 711 and a second past record state 712.

The first past record state 711 indicates the past record state of a resource belonging to a resource type A in the resource type pair (two resource types A and B) related to the recommendation condition of interest. The first past record state 711 includes information such as a resource type 761, a corresponding state 762, and a threshold 763. The resource type 761 indicates the ID of the resource type A. The corresponding state 762 indicates a corresponding state of a resource belonging to the resource type A (e.g., "the difference between the end time of the previous step and the start time of the next step is equal to or larger than a threshold"). The threshold 763 indicates a threshold that is compared with a value referred to in the corresponding state (e.g., the difference between the end time of the previous step and the start time of the next step).

The second past record state 712 indicates the past record state of a resource belonging to the resource type B in the resource type pair (two resource types A and B) related to the recommendation condition of interest. The second past record state 712 includes information such as a resource type 771, a corresponding state 772, and a threshold 773. The resource type 771 indicates the ID of the resource type B. The corresponding state 772 indicates a corresponding state of a resource belonging to the resource type B (e.g., "the difference between the end time of the previous step and the start time of the next step is smaller than a threshold"). The threshold 773 indicates a threshold that is compared with a value referred to in the corresponding state.

The estimated factor 702 indicates a factor estimated as a factor that satisfies the recommendation condition of interest.

According to the recommendation determination table 354, for example, the following is possible.

It is determined that a relationship between a stagnation that a given step for a given product has been ended but the next step has not been started and the fact that the worker in charge of the next step is busy.

It is estimated that the factor of the stagnation of the product is the busyness of the worker.

At least some information in one or more records of the recommendation determination table 354 may be additional or modified information according to information manually input by a user or may be additional or modified information as a result of machine learning.

The recommendation determination table 354 described above is an example of pattern information that is information indicating one or more condition sets. Each condition set is a set of a first condition and a second condition. In terms of each condition set, the first condition in the condition set is a condition for at least one of a time in an inter-step range and a time in an intra-step range for one resource type, and the second condition in the condition set is a condition for at least one of a time in an inter-step range and a time in an intra-step range for another resource type different from the one resource type corresponding to the first condition in the condition set. The recommendation condition 701 is an example of information indicating the condition set. The first past record state 711 is an example of information indicating the first condition. The second past record state 712 is an example of information indicating the second condition.

FIG. 8 shows an example of the event past record table group 355.

The event past record table group 355 includes a plurality of event past tables corresponding respectively to a plurality of resource types. In the present embodiment, the event past record table group 355 includes a Material event table (an event past record table for Material) 801, a Man event table (an event past record table for Man) 802, and a Machine event table (an event past record table for Machine) 803.

The Material event table 801 has records for individual products on a one-to-one basis. Each record stores information such as a product ID 811, a time 812, a step ID 813, and an event 814. One product is taken as an example (which is a "product of interest" in the description of FIG. 8). The product ID 811 indicates the ID of the product of interest. The time 812 indicates the occurrence time of an event that occurred in a step for the product of interest (e.g., the start time or end time of the event). The event 814 indicates the content of the event (e.g., outline or type).

The Man event table 802 has records for individual workers on a one-to-one basis. Each record stores information such as a worker ID 821, a time 822, a target product 823, a step ID 824, and an event 825. One worker is taken as an example (which is a "worker of interest" in the description of FIG. 8). The worker ID 821 indicates the ID of the worker of interest. The time 822 indicates the occurrence time of an event that occurred in a step performed by the worker of interest on the product. The target product 823 indicates the ID of the product on which the step is performed by the worker of interest. The step ID 824 indicates the ID of the step performed by the worker of interest. The event 825 indicates the content of the event in the step performed on the product of interest.

The Machine event table 803 has records for individual facilities on a one-to-one basis. Each record stores information such as a facility ID 831, a time 832, a target product 833, a step ID 834, and an event 835. One facility is taken as an example (which is a "facility of interest" in the description of FIG. 8). The facility ID 831 indicates the ID of the facility of interest. The time 832 indicates the occurrence time of an event that occurred in a step performed by the facility of interest on the product. The target product 833 indicates the ID of a product on which the step is performed by the facility of interest. The step ID 834 indicates the ID of the step performed by the facility of interest. The event 825 indicates the content of the event in the step performed on the product of interest.

At least some information in one or more records of the event past record table group 355 may be additional or modified information according to information manually input by a user or may be additional or modified information based on the raw data described above. Also, for at least one resource type, for at least one event, information for specifying a period during which the event occurred (e.g., the start time and end time of the event) instead of the occurrence time of the event may be stored in the event past record table.

Figure 9:
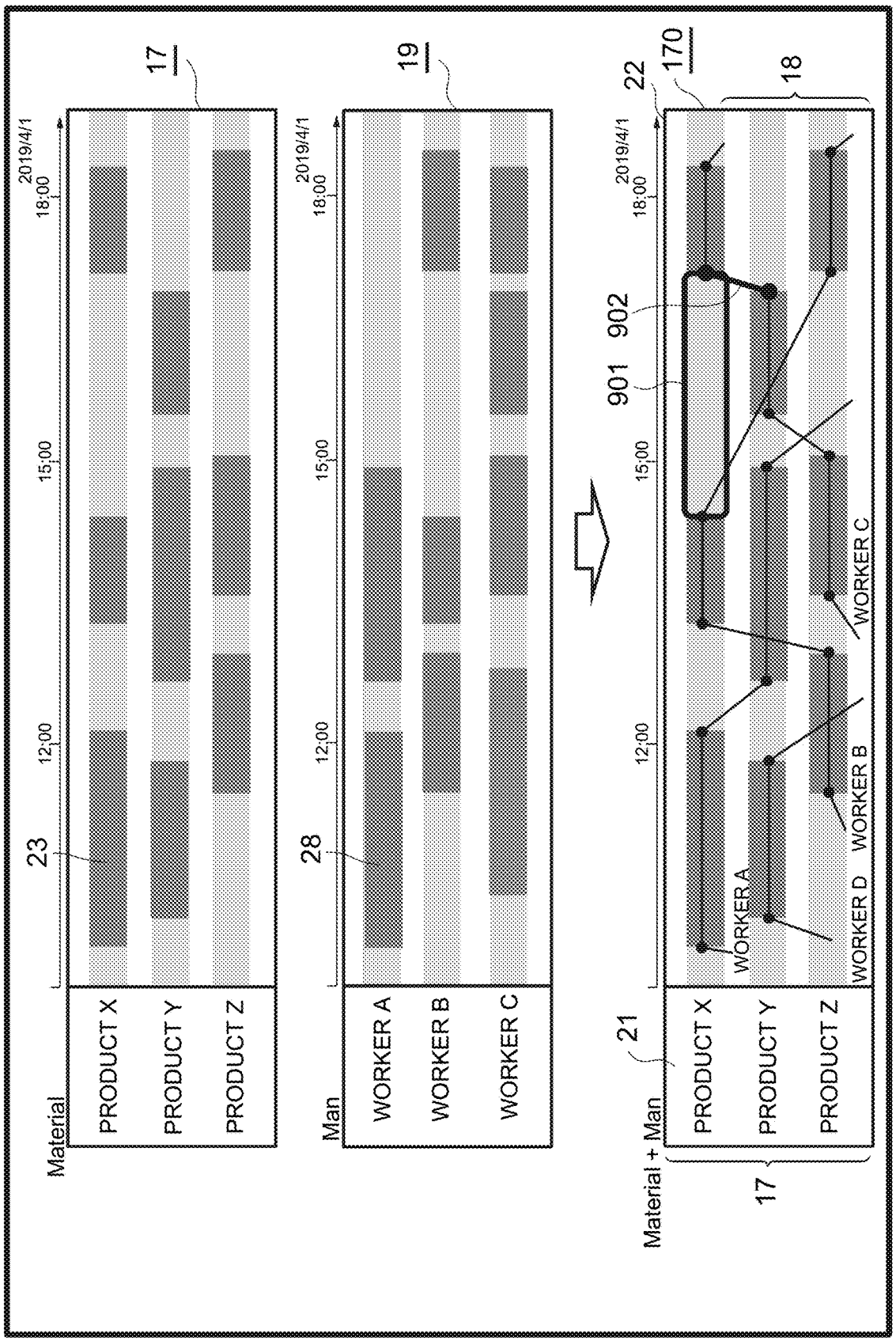
FIG. 9 shows the concept of an example of an overlay chart.

FIG. 9 shows the concept of an example of an overlay chart according to the present embodiment. Note that, In the following description, a resource belonging to an n-th resource type (n is a natural number) is referred to as an "n-th resource".

An overlay chart 170 is a chart in which a diagram chart 18 obtained by converting a Gantt chart 19 for a second resource type (e.g., Man) is relatively superimposed on a Gantt chart 17 fora first resource type (e.g., Material). For each resource type, the Gantt chart and the diagram chart each corresponds to a past record chart showing each past record of a plurality of resources belonging to the resource type.

A Gantt chart is adopted as the past record chart for the first resource type. For one resource type, when the time zones of execution (e.g., operation or work) for the respective resources belonging to the resource type are viewed side by side, a Gantt chart having a first axis serving as a resource axis and a second axis (an axis orthogonal to the first axis) serving as a time axis provides high visibility in holistically viewing all the resources. Then, the Gantt chart is a chart generally used in production management. Therefore, if the past record chart for the first resource type is a Gantt chart, it is considered to make it easier for a user to understand the display contents.

For the first resource type, the user can find, from the Gantt chart 17 on the basis of the length of an execution zone 23 (a zone indicating a time zone of execution) and the length between execution zones 23, a first resource in which a trouble occurs (e.g., a first resource in which a stagnation indicating a sufficiently long length between execution zones 23 occurs). Note that, for each first resource, if the display target period (the period covered by the time axis of the Gantt chart 17) includes at least a part of the execution time zone of the first resource, the Gantt chart 17 includes an execution zone 23 indicating the at least a part of the time zone.

Similarly, for the second resource type, the user can find, from the Gantt chart 19 on the basis of the length of an execution zone 28 and the length between execution zones 28, a second resource in which a trouble occurs (e.g., a second resource in which a high load indicating a sufficiently short length between execution zones 28 occurs).

However, the Gantt chart 17 and the Gantt chart 19 make it possible to find a resource in which a trouble occurs, but impossible to estimate a factor of the trouble.

Figure 10:
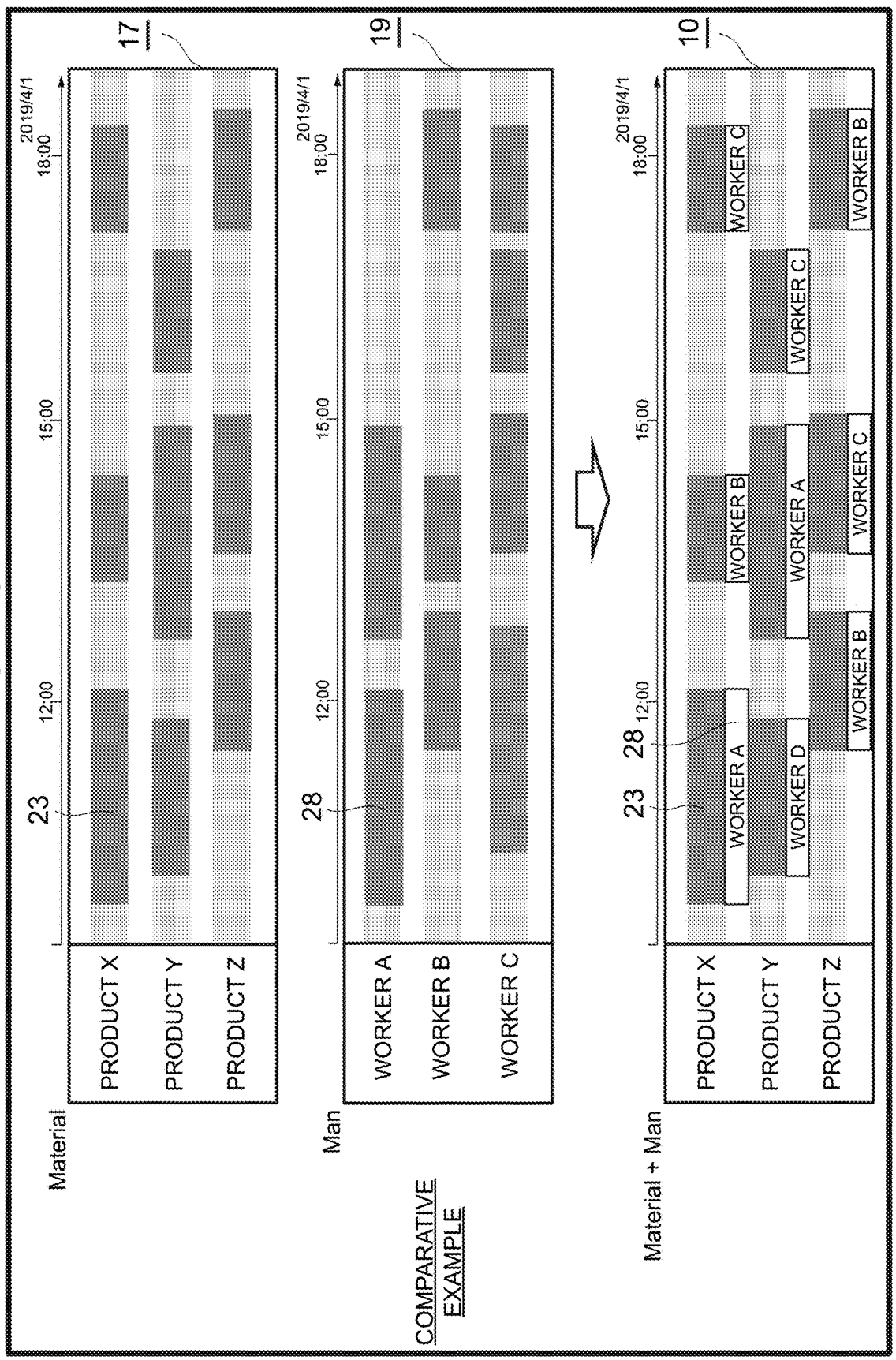
FIG. 10 shows the concept of a comparative example of an overlay chart.

Therefore, superimposition of the Gantt chart 17 for the first resource type and the Gantt chart 19 for the second resource type is now considered. As an example of the result of superimposing the Gantt chart 17 and the Gantt chart 19, it can be considered that an overlay chart 170 shown in FIG. 10 is provided. In the overlay chart 170, for each first resource belonging to the first resource type (an example of the resource type serving as a base out of the first resource type and the second resource type), the execution zones 28 are drawn for the second resource related to the execution of the first resource in addition to the execution zones 23.

However, simply superimposing the two Gantt charts makes it difficult to trace a relationship between the second resource of user interest and the execution of the first resource (e.g., history and flow) and thus difficult to understand the influence of execution (e.g., work) of the previous and next steps. Therefore, it is difficult to guess the factor of a trouble that has occurred in the resource.

In the present embodiment, as shown in the overlay chart 170 illustrated in FIG. 9, for each second resource (each worker in the example of FIG. 9), a polygonal line 24 is adopted instead of the execution zone 28. Specifically, as described above, in the overlay chart 170, for each second resource, there is a polygonal line 24 connecting a plurality of points corresponding to the second resource on the Gantt chart 17, and each of the plurality of points is plotted at a position (coordinates) that corresponds to an execution time of a step performed on the second resource and the first resource (a product in the example of FIG. 9) related to the second resource and the step. Thus, the Gantt chart 17 is used as the past record chart of the first resource type, the diagram chart 18 is used as the past record chart of the second resource type, and the diagram chart 18 is superimposed on the Gantt chart 17, so that the execution zones 23 of each first resource are associated with a plurality of polygonal lines 24 of a plurality of second resources. This makes it easier to trace for which first resource the second resource of user interest has performed a step. As a result, it is easy to recognize the influence of the second resource on the first resource, and therefore, it is possible to guess the factor of a trouble that has occurred in the first resource. Accordingly, although simply superimposing the two Gantt charts 17 and 19 makes it difficult for the user to estimate a trouble that has occurred in the resource, the overlay chart 170 according to the present embodiment makes it easier for the user to estimate the trouble. For example, from the overlay chart 170 illustrated in FIG. 9, the user recognizes the following matter. Accordingly, a portion (interval between execution zones) 901 indicates a long stagnation of product X, and a portion (line segment) 902 related to the portion 901 indicates that worker C is under high load. Therefore, the user can estimate that the factor of the stagnation of product X is a wait for worker C to start a step for product X. As countermeasures to the factor estimated in this way, it is considered that, for example, the state such as a trouble in the previous step is checked or the arrangement of workers is changed.

In addition, in the limited display range of a display screen of the display device, the visibility of the connection between the previous and next steps from the viewpoint of the second resource type is improved using the Gantt chart 17 for the first resource type as a base.

In the overlay chart 170, the display mode (e.g., color, thickness, line type) of the polygonal line 24 may be different depending on each second resource.

Also, in the overlay chart 170, two or more diagram charts corresponding respectively to two or more second resource types may be superimposed on the Gantt chart for the first resource type.

Also, in the present embodiment, the management server program 271 may determine whether or not any one of the recommendation conditions for the first resource type and the second resource type is satisfied on the basis of the execution past record table group 351 and the recommendation determination table 354. When the corresponding recommendation condition is found, the management server program 271 may accentuate a portion of the overlay chart 170 corresponding to the satisfied recommendation condition. This allows the user to quickly recognize a noteworthy state in terms of the mutual influence of the first resource type and the second resource type. Note that the example of FIG. 9 shows the following matter. In terms of the satisfied recommendation condition, the condition for the first resource type is "the difference between the end time of the previous step and the start time of the next step is equal to or larger than a threshold", and the condition for the second resource type is "the difference between the end time of the previous step and the start time of the next step is smaller than a threshold". The corresponding portions in the overlay chart 170 are the portion 901 for product X and the portion 902 for worker C. Each of the portions 901 and 902 is accentuated. In the example of FIG. 9, the accentuation is to display a frame or make a line thicker, but another method such as a text display may be adopted instead.

The following will describe some examples of processing performed in the present embodiment.

Figure 11:
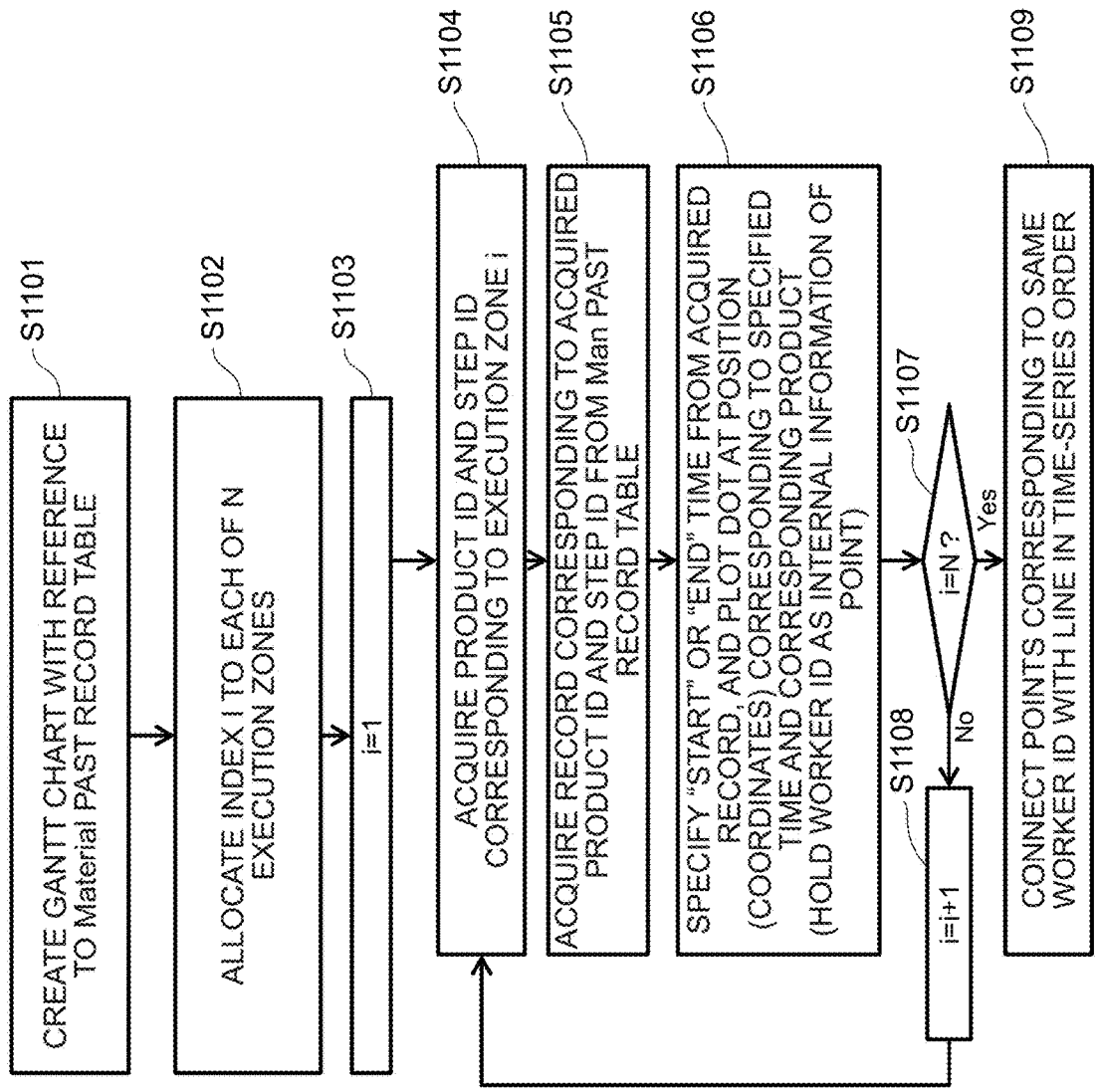
FIG. 11 shows an example of the flow of an overlay chart generation process.

FIG. 11 shows an example of the flow of an overlay chart generation process. It is assumed that, in the description of FIG. 11, the first resource type is Material and the second resource type is Man.

In S1101, the management server program 271 refers to the Material past record table 401 (see FIG. 4) and generates a Gantt chart for each product whose time (the time indicated by the time 412) is included in the display target period. The display target period may be a period specified by the user or may be a period automatically determined by the management server program 271. As described above, the Gantt chart has a resource axis (e.g., a vertical axis) and a time axis (e.g., a horizontal axis) orthogonal to the resource axis. The coordinate on the resource axis can be referred to as "resource coordinate", and the coordinate on the "time axis" can be referred to as "time coordinate".

In S1102, the management server program 271 allocates index i to each of N execution zones. N is the number of execution zones in the Gantt chart. Here, i is a natural number and a serial number from 1. In the description of FIG. 11, the execution zone with index i is referred to as "execution zone i".

In S1103, the management server program 271 focuses on the execution zone of i=1.

In S1104, the management server program 271 acquires the product ID and the step ID corresponding to execution zone i. "Product ID corresponding to execution zone i" is the product ID of the product corresponding to the resource coordinate of execution zone i. "Step ID corresponding to execution zone i" is the step ID indicated by the step ID 413 corresponding to the time 412 and the status 414 indicating execution zone i.

In S1105, the management server program 271 acquires a record corresponding to the product ID and the step ID acquired in S1104 (the record storing the target product 423 indicated by the product ID and the step ID 424 indicated by the step ID) from the Man past record table 402.

In S1106, the management server program 271 specifies the time 422 for which the status 425 is "start" or "end" from the record acquired in S1105 and plots a point at the position (resource coordinate and time coordinate) corresponding to the time indicated by the specified time 422 and the product ID indicated by the target product 423. The management server program 271 associates the plotted point with the worker ID indicated by the worker ID 421 in the record acquired in S1105.

In S1107, the management server program 271 determines whether or not i=N, i.e., whether or not S1104 to S1106 have been performed for N execution zones. When the determination result in S1107 is false (S1107: No), the management server program 271 increments i by 1 (S1108) and performs S1104 and subsequent steps.

When the determination result in S1107 is true (S1107: Yes), the management server program 271 connects, for each worker ID associated in S1106, points corresponding to the same worker ID with a line in time-series order in S1109.

As described above, an overlay chart is generated in which the Man diagram chart is relatively superimposed on the Material Gantt chart. Specifically, on the coordinate system in the Material Gantt chart, points are plotted for each worker at coordinates corresponding to the time of execution by the worker and the product to be executed, and the points are connected with a line. For each product, since the points depend on the time of execution by the worker, the points are not necessarily plotted at both ends of the execution zone corresponding to the product. For example, a point may be plotted between execution zones.

In the present embodiment, the selection of a resource type related to the overlay chart may be performed by the user or may be performed by the management server program 271. In any case, a factor estimation support process that is a process for supporting the estimation of a factor of a trouble is performed. The following will describe some case examples.

<Case where Resource Type is Selected by User>

Figure 12:
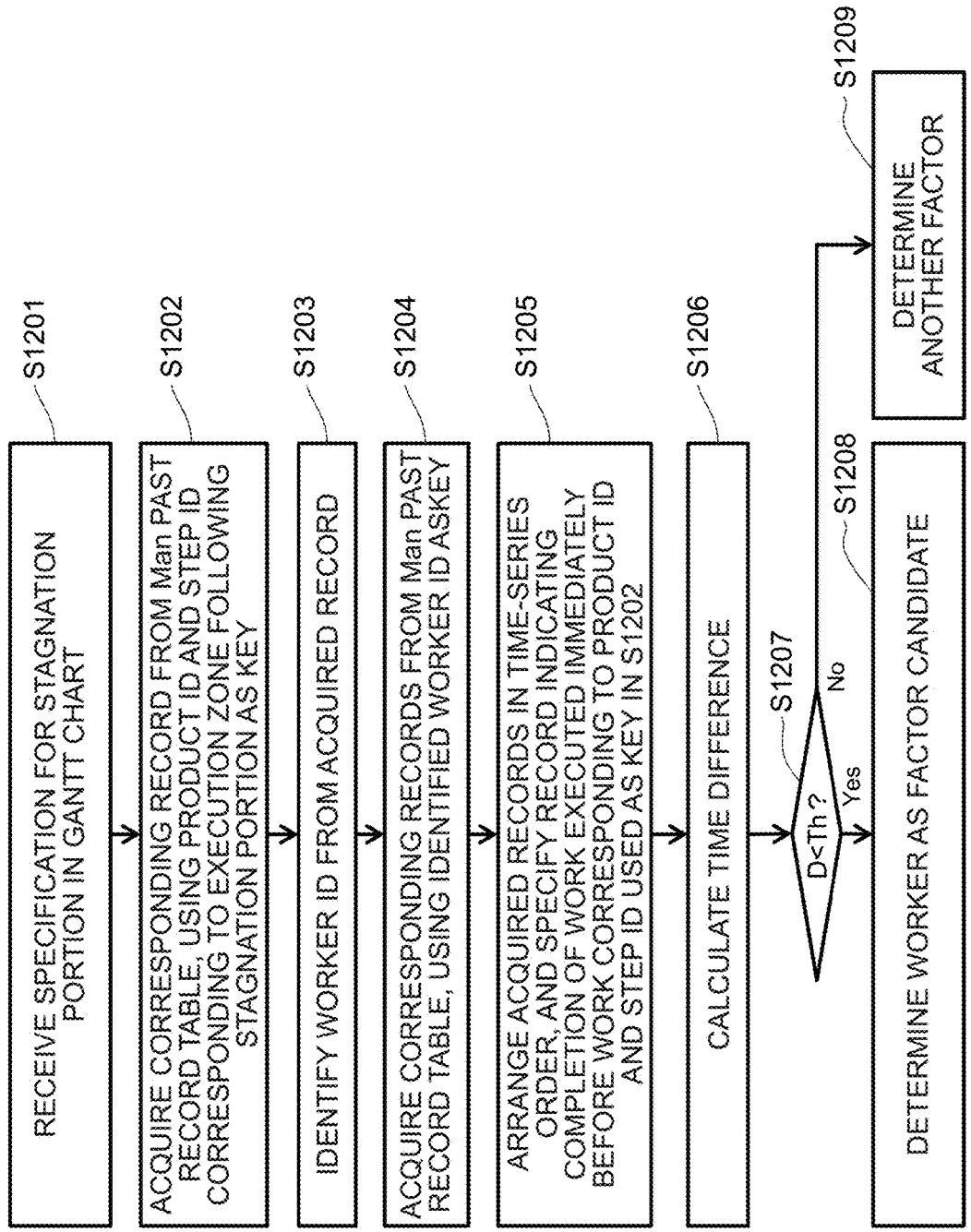
FIG. 12 shows an example of the flow of a first factor estimation support process.

FIG. 12 shows an example of the flow of a first factor estimation support process. Note that, according to the example of FIG. 12, Material has been selected by the user as the first resource type, and Man has been selected by the user as the second resource type. The first factor estimation support process illustrated in FIG. 12 may be started, for example, when a predetermined instruction (e.g., an instruction to check a production past record) is received from the user after Material and Man are selected.

In S1201, the management server program 271 receives a user specification (e.g., click or touch) for a stagnant portion in the Gantt chart for Material. The stagnation point is a portion indicating a long stagnation for any of the products (e.g., a portion where the interval between execution zones is long) and is an example of a portion of user interest. The user specification is an example of a user operation.

In S1202, the management server program 271 identifies the product ID and the step ID corresponding to the execution zone following the stagnation portion specified in S1201 and acquires, using the product ID and the step ID as a key, corresponding records from the Man record table 402.

In S1203, the management server program 271 identifies the worker ID from the record acquired in S1202.

In S1204, the management server program 271 acquires, using the worker ID identified in S1203 as a key, corresponding records from the Man record table 402. Here, all records having the worker ID 421 indicating the worker ID are acquired.

In S1205, the management server program 271 arranges the records acquired in S1204 in time-series order (ascending order of the time indicated by the time 422). The management server program 271 specifies a record indicating a status 425 of "end" of the work (step) performed immediately before the work (step) corresponding to the product ID and the step ID used as a key in S1202, from the records in the time-series order.

In S1206, the management server program 271 calculates a difference between the time indicated by the record specified in S1205 (i.e., the end time of the previous step) and the start time of the work (step) indicated by the record corresponding to the product ID and the step ID used as keys in S1202 (the time indicated by the time 422 corresponding to a status 425 of "start").

In S1207, the management server program 271 determines whether or not the difference (D) calculated in S1206 is smaller than a threshold (Th) indicated by the threshold 715 of the recommendation determination table 354 (threshold 715 referred to in "the difference between the end time of the previous step and the start time of the next step is smaller than the threshold").

When the determination result in S1207 is true (S1207: Yes), the management server program. 271 determines that the worker indicated by the worker ID identified in S1203 is a stagnation factor candidate in S1208.

If the determination result in S1207 is false (S1207: No), the management server program 271 determines that the worker indicated by the worker ID identified in S1203 is not a factor of the stagnation and there is a different factor in S1209.

The above is an example of the flow of the first factor estimation support process. The description of that process can be summarized as follows, for example.

The management server program 271 may receive the selection of the first resource type from the user, generate a Gantt chart for the first resource type on the basis of the management information 272 (e.g., a past record table for the first resource type), and display the Gantt chart. The management server program 271 may superimpose on the displayed Gantt chart a diagram chart having a plurality of polygonal lines corresponding to respective second resources belonging to the selected second resource type. Thus, since the overlay chart is generated using, as a base, the Gantt chart for the resource type selected by the user, this is expected to make it easier for the user to identify a trouble that has occurred on the resource type of interest and estimate a factor of the trouble. Note that the selection of the second resource type may be performed by the user or may be automatically performed by the management server program 271. For example, based on the recommendation determination table 354, the management server program 271 may specify the resource type to which a resource that satisfies the second past record state 712 in the recommendation condition 701 including the first past record state 711 that is satisfied by the first resource type belongs, and then select that resource type as the second resource type. Accordingly, the resource type to which the resource that may be the factor of the trouble that has occurred on the resource type of user interest is automatically specified, so that it is possible to further support the user in estimating the factor of the trouble. On the Gantt chart for the first resource type, only a polygonal line for a resource that may be a factor of the specified trouble may be drawn, or a polygonal line of each resource belonging to the selected second resource type may be drawn.

Also, the management server program 271 may receive the selection of the second resource type from the user, generate a diagram chart for the second resource type on the basis of the management information 272 (e.g., a past record table for the second resource type), and display the diagram chart. The management server program 271 may place the diagram chart of the selected first resource type at the back of the displayed diagram chart. In other words, the overlay chart may be generated by displaying the diagram chart first and then superimposing the diagram chart on the Gantt chart.

<Case where Resource Type is Selected by Management Server Program 271>

Figure 13:
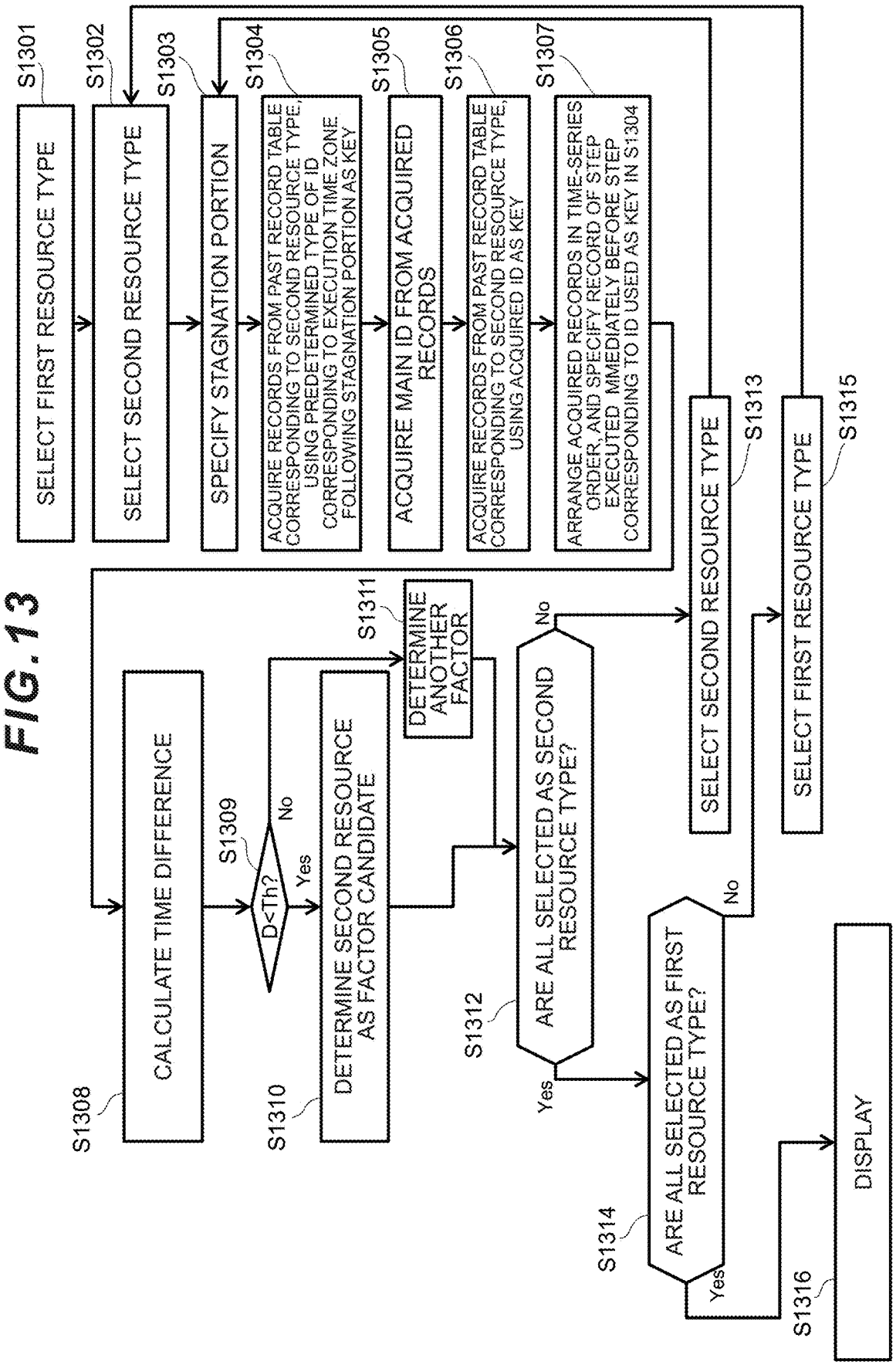
FIG. 13 shows an example of the flow of a second factor estimation support process.

FIG. 13 shows an example of the flow of a second factor estimation support process. The second factor estimation support process illustrated in FIG. 13 may be started, for example, when a predetermined instruction (e.g., an instruction to check a production past record) is received from the user.

In S1301, the management server program 271 selects a first resource type from a plurality of resource types.

In S1302, the management server program 271 selects a second resource type from the plurality of resource types except for the first resource type.

In S1303, the management server program 271 refers to the past record table for the first resource type in the execution past record table group 351 and specifies a stagnation portion. In FIG. 13, the "stagnation portion" means a portion where the length between execution time zones (the difference between the start time of a given step and the end time of the previous step) is equal to or larger than a fixed value. Also, in FIG. 13, the "execution time zone" means a time zone from the start time of a given step to the end time of the step.

In S1304, the management server program 271 acquires, using, as a key, a predetermined type of ID (e.g., at least one of a product ID, a step ID, a worker ID, and a facility ID) corresponding to the execution time zone following the stagnation portion specified in S1303, corresponding records from the past record table for the second resource type.

In S1305, the management server program 271 acquires a main ID for the second resource type (typically, an ID of a resource belonging to the second resource type) from the records acquired in S1304.

In S1306, the management server program 271 acquires records from the past record table for the second resource type, using the ID acquired in S1305 as a key.

In step S1307, the management server program 271 arranges the records acquired in step S1306 in time-series order and specifies, from the records in time-series order, a record indicating a status 425 of "end" of the step performed immediately before the step corresponding to the ID used as a key in S1304.

In S1308, the management server program 271 calculates a difference between the time indicated by the record acquired in S1307 (i.e., the end time of the previous step) and the start time of the step indicated by the record corresponding to the ID used as keys in S1304 (the time indicated by the time 422 corresponding to a status 425 of "start").

In S1309, the management server program 271 determines whether or not the difference (D) calculated in S1308 is smaller than a threshold (Th) indicated by the threshold 715 of the recommendation determination table 354 (threshold 715 referred to in "the difference between the end time of the previous step and the start time of the next step is smaller than the threshold").

When the determination result in S1309 is true (S1309: Yes), the management server program 271 determines that the second resource indicated by the ID acquired in S1305 is a stagnation factor candidate in S1310.

When the determination result in S1309 is false (S1309: No), the management server program 271 determines that there is a different factor of the stagnation in S1311.

In S1312, the management server program 271 determines whether or not all the resource types other than the first resource type have been selected as the second resource type.

When the determination result in S1312 is false (S1312: No), the management server program 271 selects any one of the resource types that have not been selected as the second resource type, as the second resource type in S1313. After that, the processing returns to S1303.

When the determination result in S1312 is true (S1312: Yes), the management server program 271 determines whether or not all the resource types have been selected as the first resource type in S1314.

When the determination result in S1314 is false (S1314: No), the management server program 271 selects any one of the resource types that have not been selected as the first resource type, as the first resource type in S1315. After that, the processing returns to S1302.

When the determination result in S1314 is true (S1314: Yes), the management server program 271 displays a list of information related to sets of a stagnation related to the first resource type and a second resource serving as a factor candidate of the stagnation in S1316. When one of the sets is specified by the user from the list, the management server program 271 may generate and display an overlay chart on which a Gantt chart for the first resource type belonging to the specified set and a diagram chart for the second resource type belonging to the specified set are superimposed one on another.

The above is an example of the flow of the second factor estimation support process. The description of that process can be summarized as follows, for example.

The management server program 271 may perform a display target determination process that is a process of determining an overlay chart to be displayed. The display target determination process may include the following steps for each of one or more resource types out of the plurality of resource types.

Selecting the resource type as the first resource type;

Selecting each of one or more resource types other than the selected first resource type as the second resource type;

Determining, on the basis of the recommendation determination table 354, whether or not any of the condition sets is satisfied for the selected first resource type and the selected second resource type; and For the determination result being true, determining as a candidate, an overlay chart in which a diagram chart for the selected second resource type is superimposed on a Gantt chart for the selected first resource type.

When one or more candidates have been determined in the display target determination process, the management server program 271 may display an overlay chart as one of the one or more candidates. This allows the user to view an overlay chart in which on a Gantt chart (or diagram chart) for a resource type to which a resource having a trouble belongs, a diagram chart (or Gantt chart) for a resource type to which a resource that possibly causes the trouble belongs is superimposed, without selecting the resource types one by one (even if neither the first resource type nor the second resource type is selected). Therefore, it is expected that the user's work load for production management will be reduced.

In the present embodiment, the management server program 271 can receive at least one selection (designation) of the first resource type and the second resource type from the user and can further receive a selection (specification) of a third resource type. For example, the management server program 271 can provide at least one of a UI (e.g., a GUI object) for receiving a first resource type and a UI for receiving a second resource type and can also provide a UI for receiving a third resource type. When the third resource type is selected by the user or the management server program 271, the management server program 271 can superimpose an event map for the third resource type on an overlay chart in which the Gantt chart for the first resource type and the diagram chart for the second resource type are superimposed one on another. Specifically, for example, when an event past record table for the third resource type includes information indicating that an event has occurred at a time within the display target period on a third resource belonging to the third resource type, the management server program 271 may superimpose, on the overlay chart, an object (e.g., a mark) representing the event at a position corresponding to the time in the event occurred in at least one of the Gantt chart and the diagram chart. This is expected to make it easier for the user to estimate a factor of the trouble that has occurred on at least one of the first resource type and the second resource type. Also, since the event map for the third resource type has a smaller amount of information than the Gantt chart and the diagram chart, even when the amount of information of the overlay chart is increased due to the superposition of the event map, it is possible to maintain high visibility. Note that an event object (an object representing an event) may have a length corresponding to a period during which the event represented by the event object has occurred. The display mode of an event object 1401 may depend on the type of the event represented by an event object 1401.

As described above, the event object may be superimposed on either the Gantt chart or the diagram chart. For example, at least one of the following may be adopted. For example, the management server program 271 may determine which of the first resource and the second resource is related to the event that has occurred on the third resource and superimpose an event object on a chart for the resource type to which the resource determined to be related belongs.

Figure 14:
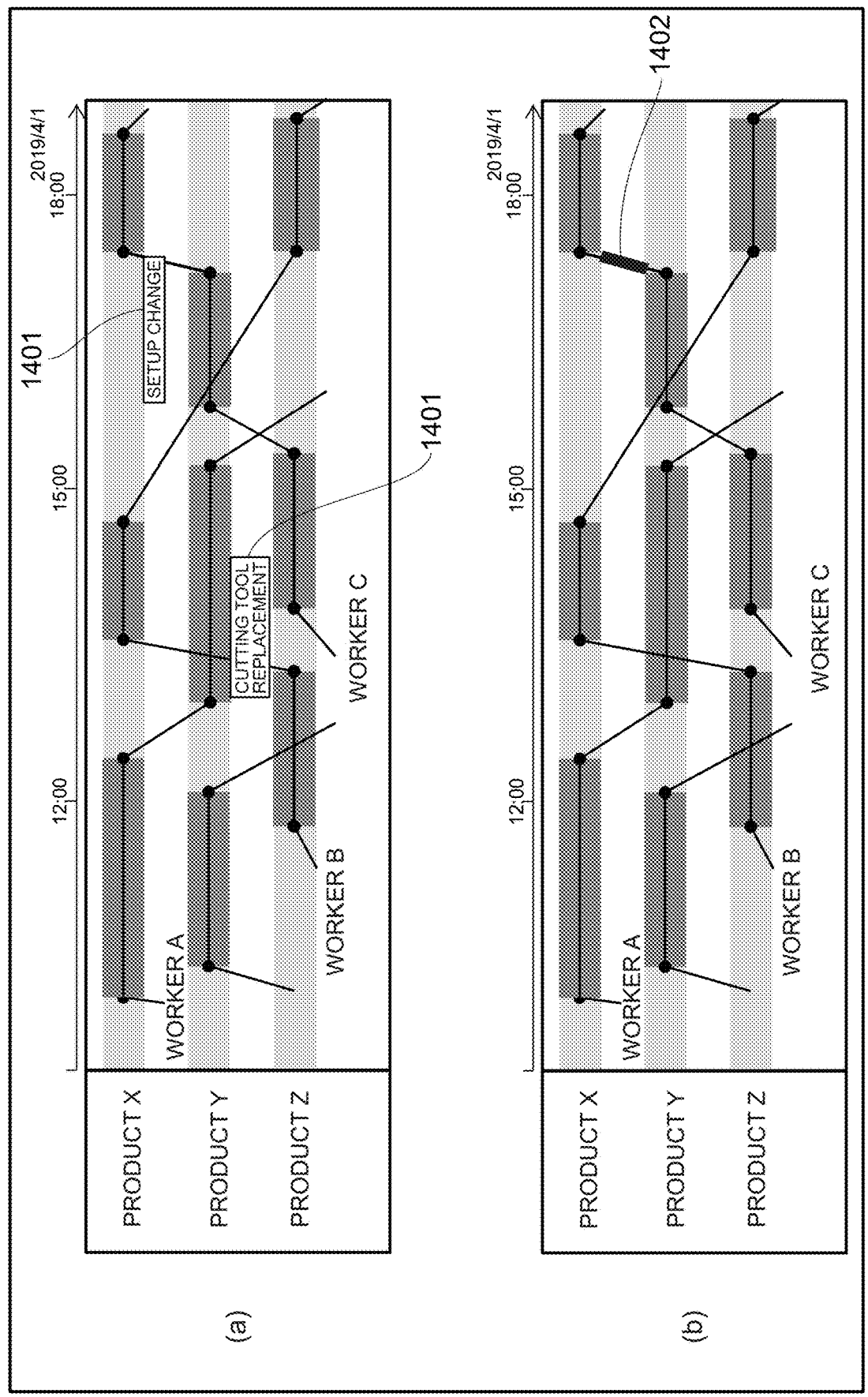
FIG. 14 shows an example of event mapping.

As shown in FIG. 14(a), the event object 1401 is superimposed on the Gantt chart. Specifically, the event object 1401 is superimposed at a position (coordinates) that corresponds to a first resource ID (e.g., a product ID) corresponding to the ID of the third resource on which the event represented by the event object 1401 has occurred and a time at which the event occurred. In the example of FIG. 14(a), the first resource type is Material, the second resource type is Man, and accordingly, the third resource type is Machine. Therefore, the event represented by the event object 1401 is an event that has occurred for a facility. The event object 1401 is, for example, a rectangular object extending in the time axis direction and is superimposed next to (adjacent to along the resource axis direction) the display range (band-shaped range) of the execution zone. The event object 1401 may have text representing the event.

As illustrated in FIG. 14(b), the event object 1402 is superimposed on the diagram chart. Specifically, the event object 1402 is superimposed at a position (coordinates) that corresponds to a second resource ID (e.g., a worker ID) corresponding to the ID of the third resource on which the event represented by the event object 1402 has occurred and a time at which the event occurred.

Also, in the present embodiment, the management server program 271 may superimpose an event object representing an event for a resource belonging to the third resource type on at least one of the Gantt chart and the diagram chart, when the relationship between a past record of a resource belonging to the first resource type and a past record of a resource belonging to the second resource type does not satisfy a predetermined condition (e.g., does not satisfy any of the recommendation conditions indicated in the recommendation determination table 354), instead of when the third resource type is selected by the user. For example, the superposition of the event object may be performed as a trigger when S1209 in FIG. 12 or S1311 in FIG. 13 is performed. Accordingly, when it is impossible to estimate a factor of a trouble from the relationship between a past record of a resource belonging to the first resource type and a past record of a resource belonging to the second resource type, the event object is mapped, so that the possibility of estimating the factor of the trouble can be increased.

Figure 15:
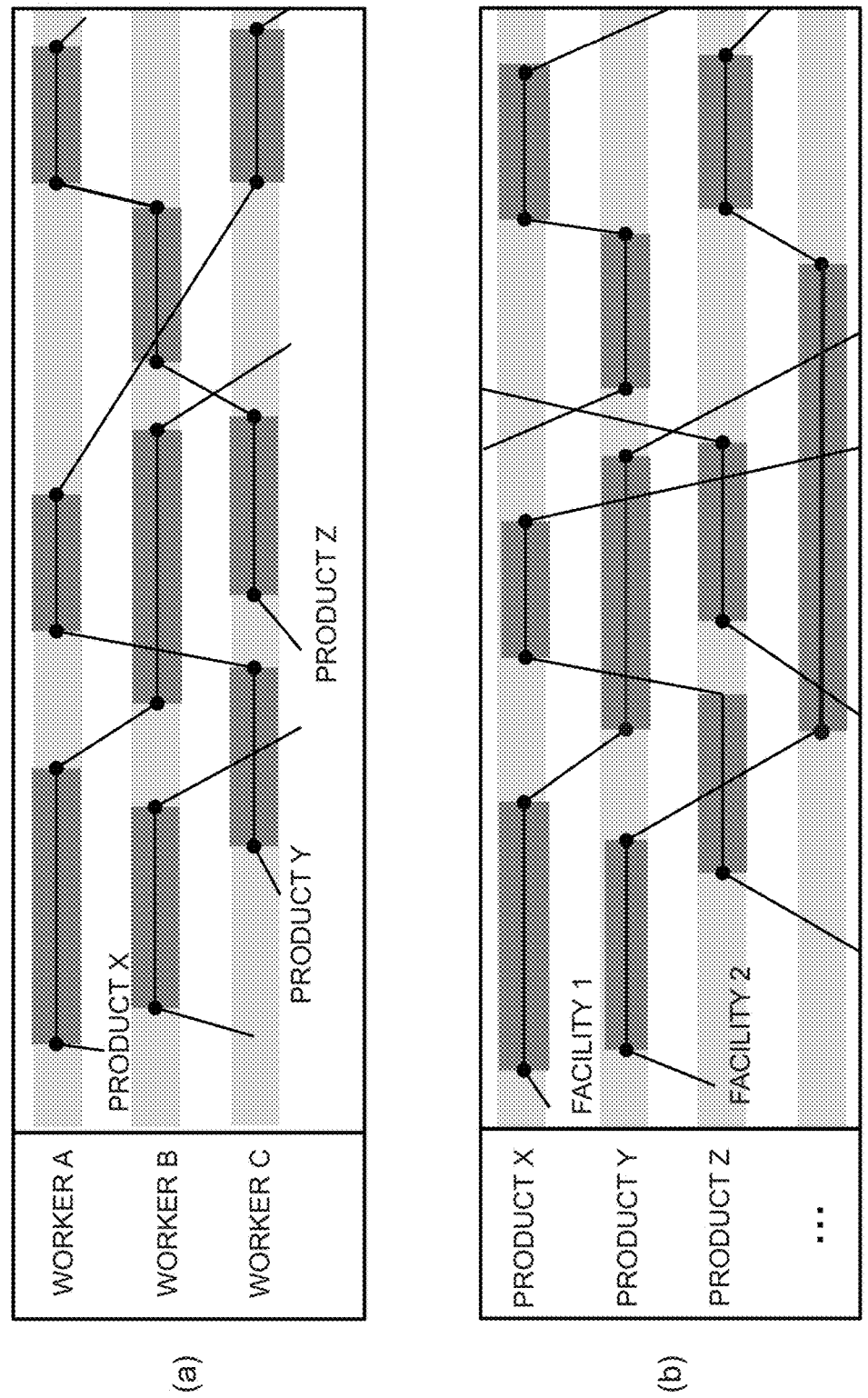
FIG. 15 shows another example of an overlay chart.

In the above description, mainly as an example, Material is adopted as the first resource type and Man is adopted as the second resource type. However, the first resource type and the second resource type are each limited to the examples described above. For example, as illustrated in FIG. 15(a), the first resource type may be Man and the second resource type may be Material, or as illustrated in FIG. 15(b), the first resource type may be Material and the second resource type may be Machine.

Also, in the present embodiment, for at least one of the first resource type and the second resource type, when specifying a resource having a time zone in which a deviation of equal to or more than a fixed value between a past record and a plan on the basis of the execution past record table group 351 and the execution plan table group 352, the management server program 271 may accentuate a portion corresponding to the time zone for the resource in the overlay chart. This is expected to increase the possibility of estimating a factor of the trouble. Note that, specifically, for example, at least one of the following may be adopted.

Figure 16:
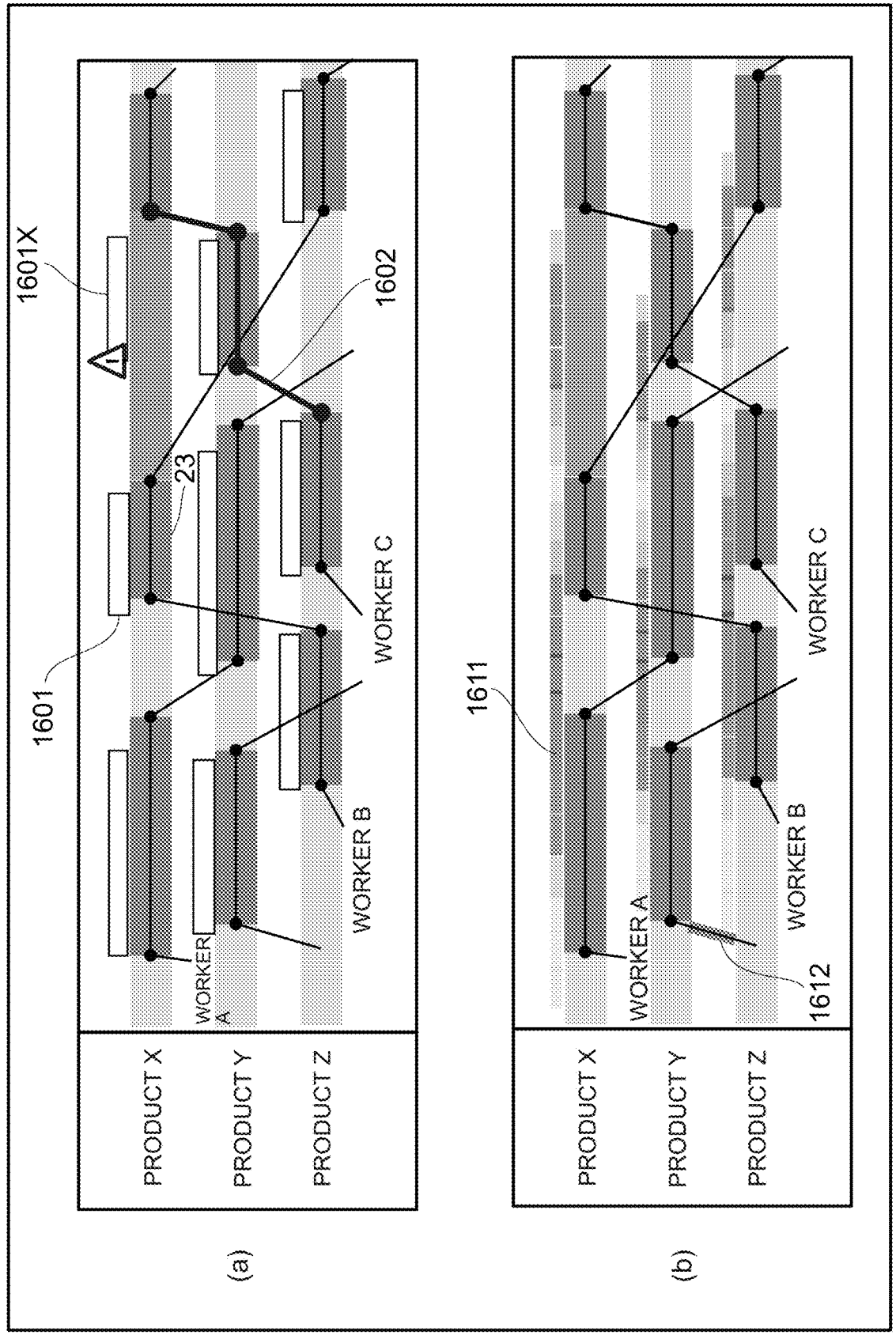
FIG. 16 shows another example of an overlay chart.

As shown in FIG. 16(a), for the first resource type, for each first resource, a plan zone 1601 that is an object representing a planned execution time zone is displayed, for example, next to the display range (a band-shaped range extending in the time axis direction) of the execution zone 23. Thus, it is possible to display the plan zone 1601 while maintaining the display of the execution zone 23. Then, when there is a planned execution time zone having a deviation of equal to or more than a fixed value from the actual execution time zone, a plan zone 1601X corresponding to the planned execution time zone is accentuated.

As shown in FIG. 16(a), when there is an actual execution time zone having a deviation of equal to or more than a fixed value from the planned execution time zone, a line segment corresponding to the execution time zone is accentuated as illustrated by means of reference numeral 1602.

Although not illustrated, at least a plan indicated by the execution plan table for Material may show a standard time (ST) and a lead time (LT). The ST is a work execution time serving as a reference set for each step. The LT is a work execution time serving as a reference used from the start to the end of a series of steps corresponding to a model. The management server program 271 may calculate actual ST and LT for each product from the Material past record table 401. When there is a planned ST having a deviation of equal to or more than a fixed value from the calculated actual ST, a portion corresponding to the ST in the Gantt chart or the diagram chart may be accentuated by the management server program 271. Also, when there is a planned LT having a deviation of equal to or more than a fixed value from the calculated actual LT, a portion corresponding to the LT in the Gantt chart or the diagram chart may be accentuated by the management server program 271.

Also, in the present embodiment, a retention number at each time may be calculated. The retention number at each time is the number of products retaining at the time. Also, the retention number may be calculated for each resource belonging to a resource type other than Material, for example, for each facility or each worker. In the overlay chart, at least a part of the display mode of the Gantt chart and the diagram chart may depend on the calculated retention number. This is expected to increase the possibility of estimating a factor of the trouble. Note that, specifically, for example, at least one of the following may be adopted.

As shown in FIG. 16(b), for the first resource type, for each first resource, a heat map 1611 that is long along the time axis is displayed, for example, next to the display range (a band-shaped range extending in the time axis direction) of the execution zone 23. The heat map 1611 is a map in which the retention number at each time is represented in density. The heat map 1611 has, for example, a larger retention number as it gets darker. This makes it possible to recognize the retention number at each time while maintaining the display of the execution zone 23. Note that, when the first resource is a product, the heat map 1611 may show a retention number calculated for the second resource (or another type of resource) that performs a step for the product. When the first resource is a worker or a facility, the heat map 1611 may show a retention number calculated for the worker or the facility.

As shown in FIG. 16(b), for the second resource type, as indicated by reference numeral 1612, a portion having a retention number of equal to or more than a fixed value in the polygonal line is accentuated.

Also, in the present embodiment, when the first resource type is Material, the management server program 271 may perform, on the basis of the execution past record table group 351, the execution plan table group 352, and the parts related table group 353 (examples of information indicating a planned step and a planned execution time zone for each product, information indicating a relationship between the product and parts, and information indicating a plan and a past record of the arrangement of each part), at least one of the following on the Gantt Chart for Material for a product having an execution time that is delayed from the planned execution time zone out of products belonging to Material. Note that, in each of FIGS. 17(a) to 17(c), for each product, a white rectangular object is an object representing a planned execution time zone, and a gray rectangular object arranged below the white rectangular object is an object representing an actual execution time zone. Also, "the Gantt chart for Material" used herein may be a Gantt chart in the overlay chart or may be a Gantt chart different from the overlay chart (e.g., a Gantt chart before the diagram chart is superimposed).

As shown in FIG. 17(a), when the current time is later than the start time of the planned execution time zone for the product, and at least one part of the product has not been served in a predetermined location at the current time (reference numeral 1701 is an object representing the current time), the management server program 271 places an object 1702 representing a part shortage at a position corresponding to the product and the current time in the Gantt chart for Material or in the vicinity of the position. This allows the user to specify a product in which at least some of the parts have not been served at the current time, and thus it is expected that the possibility of estimating a factor of the trouble is increased.

As shown in FIG. 17(b), when all the parts of the product are served in the predetermined location, the management server program 271 places an object 1711 representing the completion of serving at a position corresponding to the product and the time when the serving of all the parts was completed in the Gantt chart for Material or in the vicinity of the position. This allows the user to recognize how long the delay of serving all the parts is from the planned execution start time, and thus it is expected that the possibility of estimating a factor of the trouble.

As shown in FIG. 17(c), the management server program 271 places an object (e.g., a heat map) 1721 representing a state transition to a final state indicating the completion of serving for a part that has not been served yet at the start time of the planned execution time zone and a relationship between the number of parts and the time in each state, at a position corresponding to the product and a time earlier than the start time of the execution time zone for the product in the Gantt chart for Material or in the vicinity of the position. This allows the user to recognize in the past how the state of the parts and the number of parts have changed for each product until the end of the step and the start of the next step, and thus it is expected that the possibility of estimating a factor of the trouble is increased.

While the embodiment of the present invention has been described heretofore, the embodiment is an example for describing the present invention and is not intended to limit the scope of the present invention to the embodiment. The present invention can be implemented even in various other forms.

For example, in the embodiment described above, the so-called 3M: Man, Machine, and Material are adopted as the plurality of resource types. However, another resource type may be adopted instead of one of the 3M, or other resource type (s) (e.g., Money) may be adopted in addition to the 3M.

Also, for example, the present invention may be applied to support for management other than production management. Specifically, for example, the present invention may be applied to support for management of an environment where there are none of the resource types of Man, Machine, and Material. In this case, the management information may include information indicating past records of a plurality of resources belonging to a plurality of resource types including a resource type different from at least one of Man, Machine, and Material, instead of the information indicating the past records of a production system having a plurality of steps. The past record of each resource may include at least the execution time for the resource.

REFERENCE SIGNS LIST

100 PRODUCTION MANAGEMENT SUPPORTING SYSTEM

The invention claimed is:

1. A production management supporting system, comprising:
a display;
a processor coupled to the display; and
a memory coupled to the processor,
wherein the memory stores:
past product information including a plurality of records, each record indicating a product, of a plurality of products, a product identification (ID), a step ID indicating a step, among a plurality of steps of a production system, a status of the step indicated by the step ID and an execution time of the step indicated by the step ID, the status indicating one of end and start,
past worker information including a plurality of records, reach record indicating a worker ID, a product ID, a step ID and a status of the step indicated by the step ID and an execution time of the step indicated by the step ID, the status indicating one of end and start, and
a plurality of pairs of a first record and a second record, the first record indicating a product and a threshold relating to time between successive steps, the second record indicating a worker and a threshold relating to time between successive steps,
wherein the memory storing instructions that when executed by the processor, configure the processor to:
receive an input of a display target time,
generate a Gantt chart having an execution time within the display target time based on the past product information, the Gantt chart having one or more zones, and the Gantt chart having a resource axis that is an axis corresponding to resources, and a time axis that is an axis orthogonal to the resource axis and corresponding to time,
acquire the product ID and the step ID corresponding to each zone based on the product ID and execution time,
acquire a record corresponding to the acquired product ID and step ID from the past worker information table,
specify an execution time of the acquired record plot a point at a position corresponding to the time indicated by the specified execution time and the product ID on the Gantt chart and associate the plotted point with the worker ID indicated by acquired record of the past worker information table, connect, for each associated worker ID, points corresponding to the same worker ID with a line in time-series order, the line being a polygonal line connecting a plurality of points corresponding to the worker on the Gantt chart, and each of the plurality of points is plotted at a position that corresponds to an execution time of a respective step performed by a worker and the product related to the worker and the step, thereby generating an overlay chart, receive a user selection of a period of time on the Gantt chart between zones of a respective product, identify the product ID and the step ID corresponding to the zone following the selected period of time, acquire, using the product ID and the step ID, a corresponding record from the past worker information, identify the worker ID from the acquired record and acquire all records having the worker ID from the past worker information, arrange the acquired records in a time-series order based on the execution times of the acquired records, specify a record having a status of end of the step performed immediately before the step corresponding to the product ID and the step ID that corresponds to the zone following the selected period of time, determine a difference between the execution time indicated by the specified record having the status of end and the execution time of the step indicated by the record corresponding to the product ID and the step ID that corresponds to the zone following the selected period of time, determine whether the calculated difference is smaller than the threshold of the second record of one of the pairs of the plurality of pairs of the first record and second record, upon determining the difference is smaller than the threshold, display an indicating that the worker indicated by the identified worker ID is a delay factor, upon determining the difference is not smaller than the threshold, determine that the worker indicated by the identified worker ID is not a delay factor, and simultaneously display the overlay chart, the line connecting the plurality points, a frame around the selected period of time, and display a portion of the line corresponding to the worker identified as the delay factor thicker than the other portion of the line.

2. The production management supporting system according to claim 1,
wherein the a first resource type is a product and a second resource type is a worker, and
wherein the processor is when the management information includes information indicating that an event has occurred at a time belonging to the display target period for a resource belonging to a third resource type, an object representing the event is placed at a position corresponding to the time when the event occurred in the overlay chart.

3. The production management supporting system according to claim 2,
wherein the processor is configured to, when a relationship between a record of the past product information and a record of the past worker information does not satisfy a predetermined condition, superimpose an object representing an event for a resource belonging to the third resource type on the diagram chart.

4. The production management supporting system according to claim 1,
wherein the memory stores information indicating an execution plan for each product of the past product information, and
the processor is configured to, upon specifying product having a deviation of equal to or more than a fixed value between a past record and a plan based on the information indicating the execution plan and the past product information, the accentuate a portion corresponding to the time zone of the resource.

5. The production management supporting system according to claim 1,
wherein the processor is configured to:
calculate a retention number at each time,
the retention number at each time, for each facility, is the number of products retaining at the time, and
in the overlay chart, at least a part of a display mode of the Gantt chart and the diagram chart depends on the calculated retention number.

6. The production management supporting system according to claim 1,
wherein the memory stores information indicating a planned step and a planned execution time zone for each product, information indicating a relationship between a product and a part, and information indicating a plan and a past record of arrangement of each part,
a first resource type is a product, and
wherein the processor is configured to, on the Gantt chart for a product having an execution time that is delayed from a planned execution time zone, at least one of the following:
place, when a current time is later than a start time of a planned execution time zone for the product, and at least one part of the product has not been served in a predetermined location at the current time, an object representing a part shortage at a position corresponding to the product and the current time in the Gantt chart;
place, when all the parts of the product are served in the predetermined location, an object representing completion of serving at a position corresponding to the product and the time when the serving of all parts was completed in the Gantt chart, and
place an object representing a state transition to a final state indicating completion of serving for a part that has not been served yet at a start time of a planned execution time zone and a relationship between the number of parts and the time in each state, at a position corresponding to the product and a time earlier than the start time of the execution time zone for the product in the Gantt chart.

7. A production management supporting method comprising:
storing:
past product information including a plurality of records, each record indicating a product, of a plurality of products, a product identification (ID), a step ID indicating a step, among a plurality of steps of a production system, a status of the step indicated by the step ID and an execution time of the step indicated by the step ID, the status indicating one of end and start,
past worker information including a plurality of records, reach record indicating a worker ID, a product ID, a step ID and a status of the step indicated by the step ID and an execution time of the step indicated by the step ID, the status indicating one of end and start, and a plurality of pairs of a first record and a second record, the first record indicating a product and a threshold relating to time between successive steps, the second record indicating a worker and a threshold relating to time between successive steps;

receiving an input of a display target time;

generating a Gantt chart having an execution time within the display target time based on the past product information, the Gantt chart having one or more zones, and the Gantt chart having a resource axis that is an axis corresponding to resources, and a time axis that is an axis orthogonal to the resource axis and corresponding to time;

acquire the product ID and the step ID corresponding to each zone based on the product ID and execution time;

acquire a record corresponding to the acquired product ID and step ID from the past worker information table;

specify an execution time of the acquired record plot a point at a position corresponding to the time indicated by the specified execution time and the product ID on the Gantt chart and associate the plotted point with the worker ID indicated by acquired record of the past worker information table;

connect, for each associated worker ID, points corresponding to the same worker ID with a line in time-series order, the line being a polygonal line connecting a plurality of points corresponding to the worker on the Gantt chart, and each of the plurality of points is plotted at a position that corresponds to an execution time of a respective step performed by a worker and the product related to the worker and the step, thereby generating an overlay chart;

receiving a user selection of a period of time on the Gantt chart between zones of a respective product;

identifying the product ID and the step ID corresponding to the zone following the selected period of time;

acquiring, using the product ID and the step ID, corresponding record from the past worker information;

identifying the worker ID from the acquired record and acquire all records having the worker ID from the past worker information;

arranging the acquired records in a time-series order based on the execution times of the acquired records;

specifying a record having a status of end of the step performed immediately before the step corresponding to the product ID and the step ID that corresponds to the zone following the selected period of time;

determining a difference between the execution time indicated by the specified record having the status of end and the execution time of the step indicated by the record corresponding to the product ID and the step ID that corresponds to the zone following the selected period of time;

determining whether the calculated difference is smaller than the threshold of the second record of one of the pairs of the plurality of pairs of the first record and second record;

upon determining the difference is smaller than the threshold, display an indicating that the worker indicated by the identified worker ID is a delay factor;

upon determining the difference is not smaller than the threshold, determining that the worker indicated by the identified worker ID is not a delay factor; and simultaneously displaying the overlay chart, the line connecting the plurality points, a frame around the selected period of time, and a portion of the line corresponding to the worker identified as the delay factor thicker than the other portion of the line.

8. A non-transitory computer readable medium storing a computer program for causing a computer to perform steps comprising:

storing:

past product information including a plurality of records, each record indicating a product, of a plurality of products, a product identification (ID), a step ID indicating a step, among a plurality of steps of a production system, a status of the step indicated by the step ID and an execution time of the step indicated by the step ID, the status indicating one of end and start, past worker information including a plurality of records, reach record indicating a worker ID, a product ID, a step ID and a status of the step indicated by the step ID and an execution time of the step indicated by the step ID, the status indicating one of end and start, and a plurality of pairs of a first record and a second record, the first record indicating a product and a threshold relating to time between successive steps, the second record indicating a worker and a threshold relating to time between successive steps;

receiving an input of a display target time;

generating a Gantt chart having an execution time within the display target time based on the past product information, the Gantt chart having one or more zones, and the Gantt chart having a resource axis that is an axis corresponding to resources, and a time axis that is an axis orthogonal to the resource axis and corresponding to time;

acquire the product ID and the step ID corresponding to each zone based on the product ID and execution time;

acquire a record corresponding to the acquired product ID and step ID from the past worker information table;

specify an execution time of the acquired record plot a point at a position corresponding to the time indicated by the specified execution time and the product ID on the Gantt chart and associate the plotted point with the worker ID indicated by acquired record of the past worker information table;

connect, for each associated worker ID, points corresponding to the same worker ID with a line in time-series order, the line being a polygonal line connecting a plurality of points corresponding to the worker on the Gantt chart, and each of the plurality of points is plotted at a position that corresponds to an execution time of a respective step performed by a worker and the product related to the worker and the step, thereby generating an overlay chart;

receiving a user selection of a period of time on the Gantt chart between zones of a respective product;

identifying the product ID and the step ID corresponding to the zone following the selected period of time;

acquiring, using the product ID and the step ID, corresponding record from the past worker information;

identifying the worker ID from the acquired record and acquire all records having the worker ID from the past worker information;

arranging the acquired records in a time-series order based on the execution times of the acquired records;

specifying a record having a status of end of the step performed immediately before the step corresponding to the product ID and the step ID that corresponds to the zone following the selected period of time;

determining a difference between the execution time indicated by the specified record having the status of end and the execution time of the step indicated by the record corresponding to the product ID and the step ID that corresponds to the zone following the selected period of time;

determining whether the calculated difference is smaller than the threshold of the second record of one of the pairs of the plurality of pairs of the first record and second record;

upon determining the difference is smaller than the threshold, display an indicating that the worker indicated by the identified worker ID is a delay factor;

upon determining the difference is not smaller than the threshold, determining that the worker indicated by the identified worker ID is not a delay factor; and simultaneously displaying the overlay chart, the line connecting the plurality points, a frame around the selected period of time, and a portion of the line corresponding to the worker identified as the delay factor thicker than the other portion of the line.

* * * * *